(12) United States Patent
Giger

(10) Patent No.: US 9,470,792 B2
(45) Date of Patent: Oct. 18, 2016

(54) METHOD AND HANDHELD DISTANCE MEASURING DEVICE FOR CREATING A SPATIAL MODEL

(71) Applicant: LEICA GEOSYSTEMS AG, Heerbrugg (CH)

(72) Inventor: Kurt Giger, Rüthi (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 0 days.

(21) Appl. No.: 14/645,557

(22) Filed: Mar. 12, 2015

(65) Prior Publication Data

US 2015/0309174 A1   Oct. 29, 2015

(30) Foreign Application Priority Data

Mar. 14, 2014 (EP) .................................... 14159774

(51) Int. Cl.
| | | |
|---|---|---|
| *G06K 9/00* | (2006.01) | |
| *G01S 17/08* | (2006.01) | |
| *G01C 11/02* | (2006.01) | |

(Continued)

(52) U.S. Cl.
CPC ................. *G01S 17/08* (2013.01); *G01C 9/06* (2013.01); *G01C 11/02* (2013.01); *G01C 15/002* (2013.01); *G01C 19/00* (2013.01); *G06T 7/0044* (2013.01); *G06T 7/0057* (2013.01); *G06T 17/10* (2013.01); *H04N 5/2257* (2013.01); *G06T 2207/10012* (2013.01); *G06T 2207/10028* (2013.01);

(Continued)

(58) Field of Classification Search
CPC .... G01C 15/002; G01C 11/02; G01C 19/00; G01C 9/06; G01S 17/08; G06T 17/10; G06T 7/0044; G06T 7/0057; G06T 2207/10012; G06T 2207/30204; G06T 2207/30244

See application file for complete search history.

(56) References Cited

U.S. PATENT DOCUMENTS

2007/0064246 A1 * 3/2007 Braunecker .......... G01C 15/002
                                                                      356/614
2010/0246892 A1   9/2010 Hirasawa et al.

(Continued)

FOREIGN PATENT DOCUMENTS

DE   10 2006 054 324 A1   5/2008
DE   10 2008 054 453 A1   6/2010

(Continued)

OTHER PUBLICATIONS

CADGorilla: "AutoCAD Tutorial—Measuring Tools", Oct. 20, 2010, Retrieved from the Internet (YouTube), (provided by the Applicant).*

(Continued)

*Primary Examiner* — Amara Abdi
(74) *Attorney, Agent, or Firm* — Maschoff Brennan

(57) ABSTRACT

Some embodiment include a handheld distance measuring device having a laser distance meter for measuring distances to target points in an environment and an image acquisition unit for acquiring images of the environment, characterized by a control unit having program code for controlling a spatial modeling functionality having a measurement sequence, in the scope of which images of a region of the environment are acquired from different positions of the distance measuring device, these images having a shared image region, wherein the image acquisition unit assumes different, which represent the respective position and alignment of the distance measuring device, during the acquisition of the first image and the second image.

18 Claims, 14 Drawing Sheets

(51) Int. Cl.
  *G01C 15/00*    (2006.01)
  *G01C 9/06*     (2006.01)
  *G01C 19/00*    (2013.01)
  *G06T 7/00*     (2006.01)
  *G06T 17/10*    (2006.01)
  *H04N 5/225*    (2006.01)

(52) U.S. Cl.
  CPC ............... *G06T2207/30204* (2013.01); *G06T 2207/30244* (2013.01)

(56) References Cited

U.S. PATENT DOCUMENTS

| | | | |
|---|---|---|---|
| 2013/0222544 A1* | 8/2013 | Roland | ............ G01C 3/08 348/46 |
| 2013/0228620 A1 | 9/2013 | Ahern et al. | |
| 2013/0314688 A1 | 11/2013 | Likholyot | |

FOREIGN PATENT DOCUMENTS

| | | | | |
|---|---|---|---|---|
| DE | 10 2010 038 507 A1 | 2/2012 | | |
| DE | 10 2010 042 733 A1 | 4/2012 | | |
| EP | 0 701 702 B1 | 3/1996 | | |
| EP | 0 738 899 A1 | 10/1996 | | |
| EP | 1 517 117 A1 | 3/2005 | | |
| EP | DE 102006054324 | * | 11/2006 | ............. G01C 11/02 |
| EP | DE 102006054324 | * | 5/2008 | ............. G01C 11/02 |
| EP | 2 669 707 A1 | 12/2013 | | |
| EP | 2 698 602 A1 | 2/2014 | | |
| WO | 02/50564 A2 | 6/2002 | | |

OTHER PUBLICATIONS

European Search Report dated Aug. 12, 2015 as received in Application No. 14159774.
The CADGorilla: "AutoCAD Tutorial—Measuring Tools", Accessed at https://www.youtube.com/watch?v=YcfnSj0_ke4, Dated Sep. 20, 2010, pp. 2.

* cited by examiner

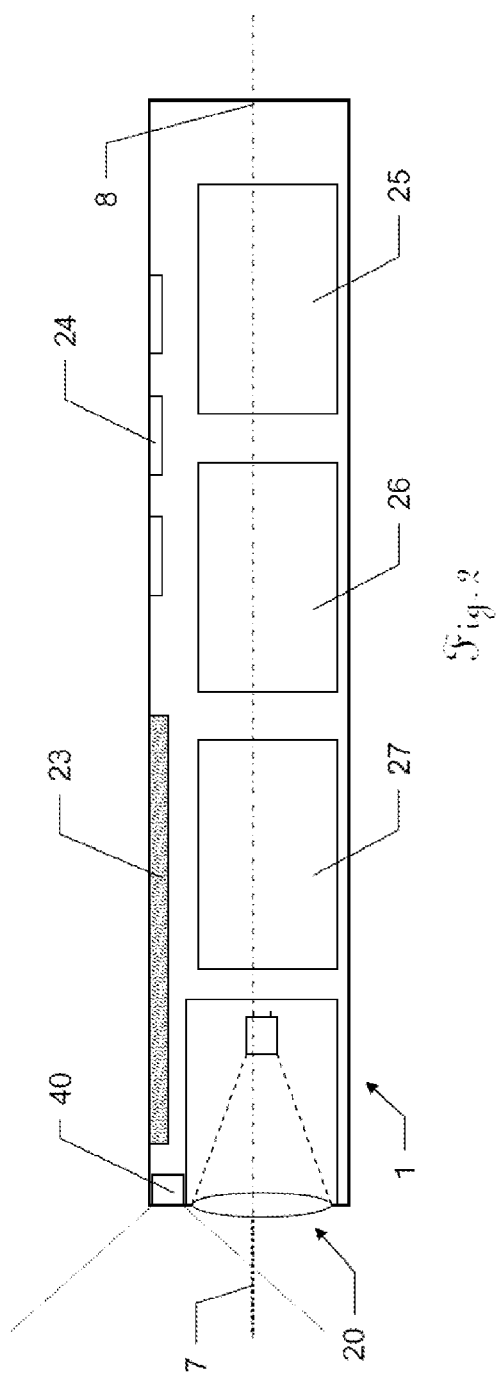
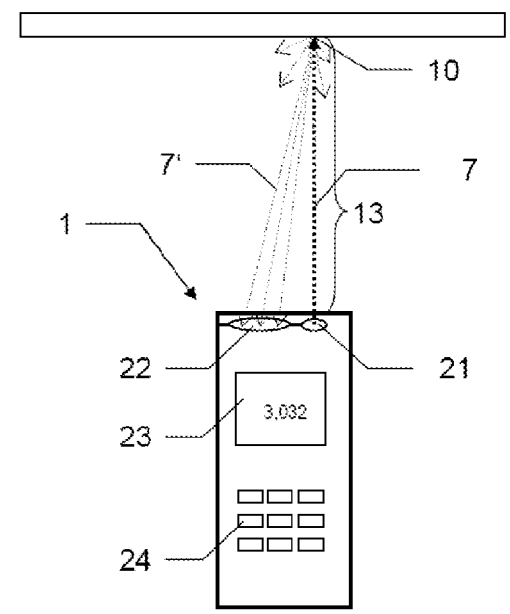

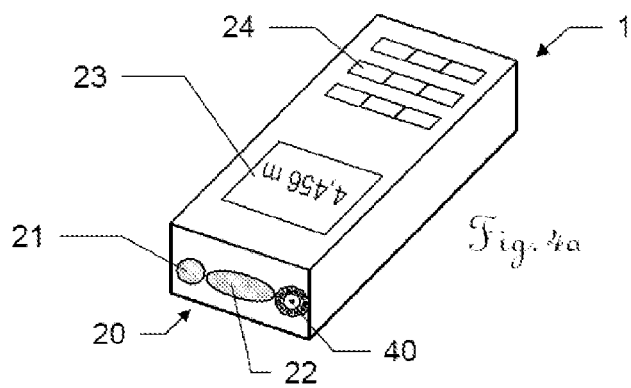
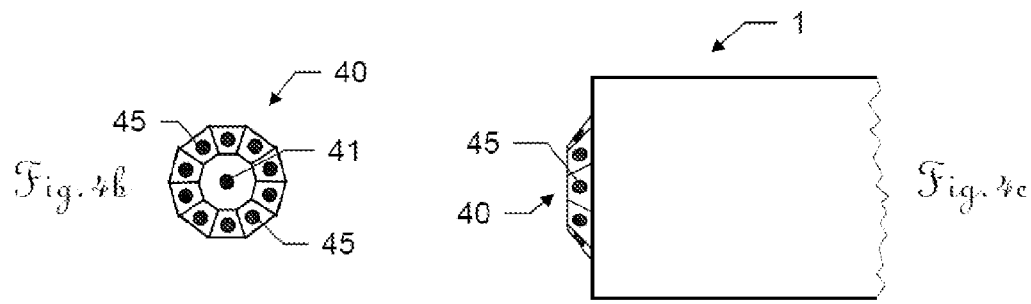
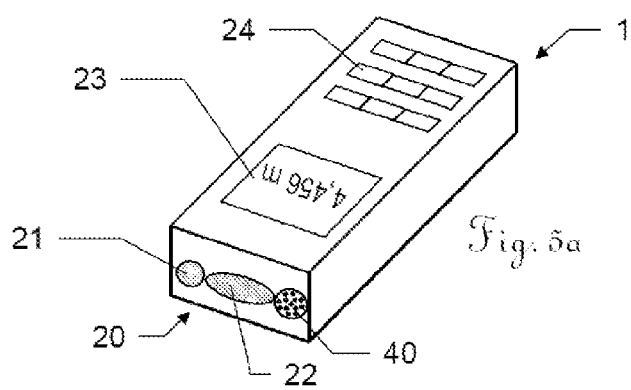
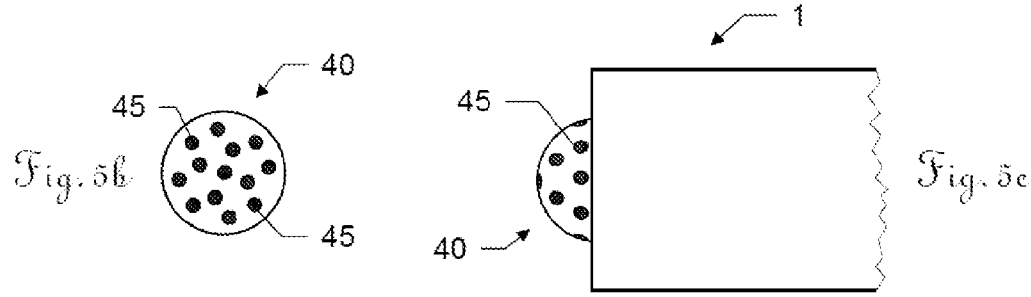

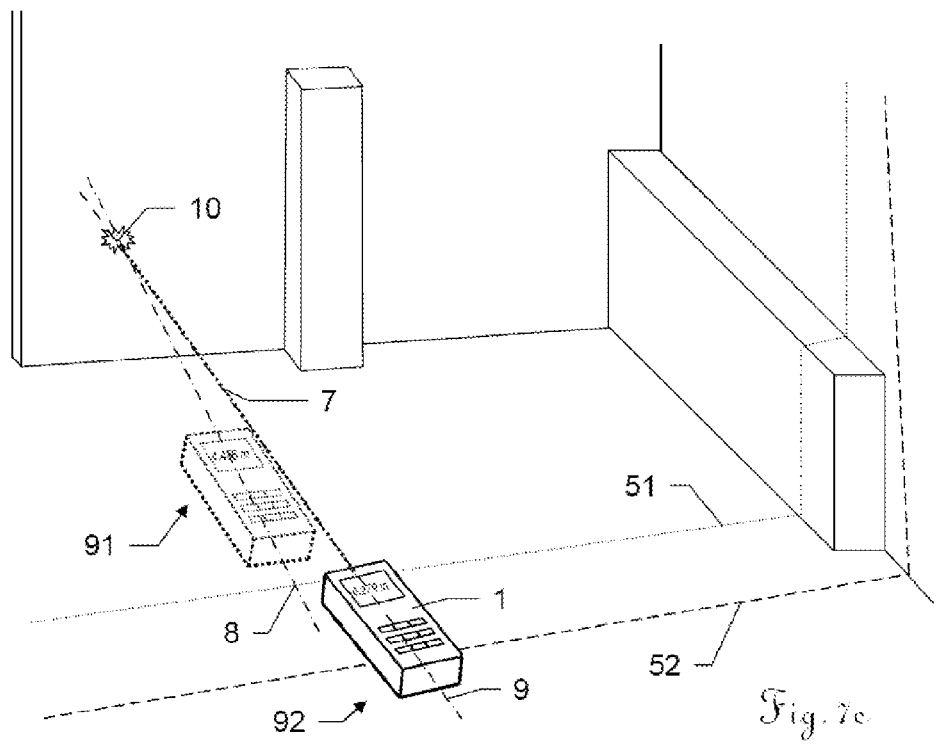
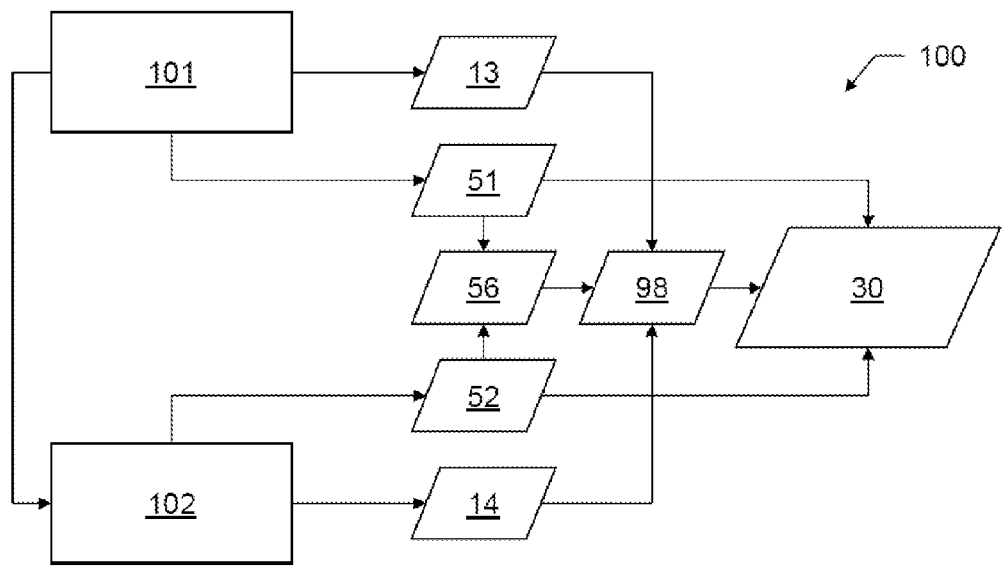

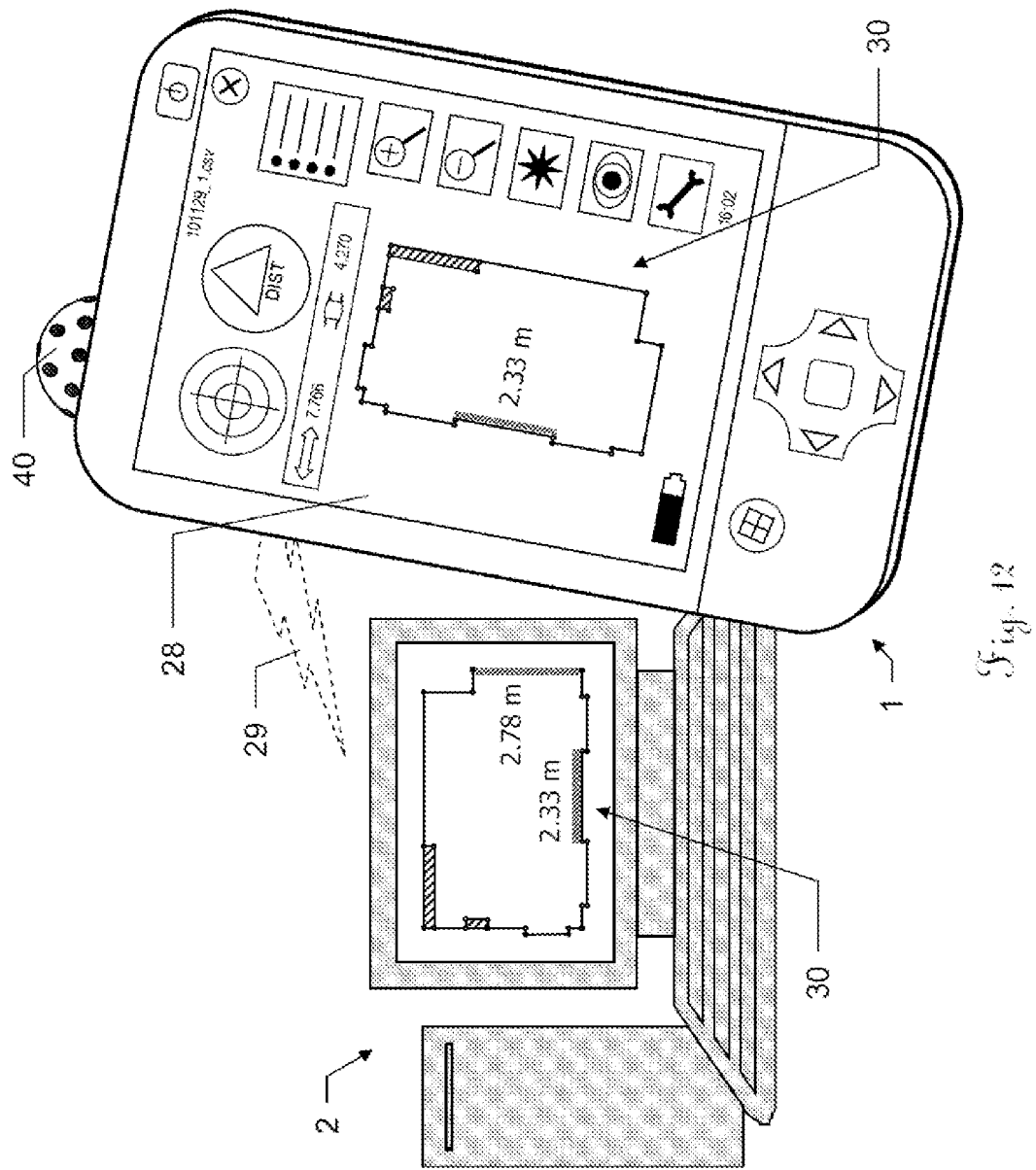

METHOD AND HANDHELD DISTANCE MEASURING DEVICE FOR CREATING A SPATIAL MODEL

FIELD OF THE INVENTION

The present invention relates to a method and a handheld distance measuring device having a distance measuring unit and at least one camera for creating a spatial model of an environment. Distances between spatial points in the environment can be ascertained on the basis of the spatial model, without having to measure these distances directly.

The invention additionally relates to a method for indirectly ascertaining a distance between two target points by means of a handheld distance measuring device, wherein a current pose of the distance measuring device during a distance measurement can be ascertained by means of photogrammetry.

BACKGROUND

Methods and systems for distance measurement are used in many applications. Examples thereof are extremely precise measurements in geodetic applications, but also measurement tasks in the field of construction installation or for industrial process controllers.

For these tasks, stationary, movable, or also handheld distance measuring devices are used, which execute an optical distance measurement to a selected target point. For this purpose, a laser beam is usually emitted and received again and analyzed after reflection on the target. Various measurement principles are available for determining the distance in this case, for example, phase measurement or runtime measurement.

In particular in the field of construction installation or construction removal, portable devices to be held in the hand are used, which are applied in relation to a structure to be surveyed and then carry out a distance measurement to a surface. One typical handheld distance measuring device, which is suitable for such applications, is described, for example, in EP 0 738 899 and EP 0 701 702.

Since a target spot which is visible on the surface to be measured is advantageous for most applications, red lasers are usually used as radiation sources for the distance measurement. Precisions down to the millimeter range are thus achievable with great handling comfort using distance meters of the prior art. Using currently available handheld distance measuring devices, measurements can be carried out from one point to another point, to which a visual connection exists. If the target is concealed, horizontal dimensions can also be ascertained by means of an inclination sensor.

Various solutions using handheld distance measuring devices having laser distance meters are described in the prior art, by means of which distances can be indirectly measured.

Thus, EP 2 698 602 A1 discloses a handheld distance measuring device having a distance measuring unit and an angle determination unit for determining spatial angles in relation to a reference coordinate system. By means of this spatial angle and two directly measured distances, the distance between two remote points can be ascertained indirectly. To use the angle determination unit, the distance measuring device must remain applied to a fixed reference body via a referencing support during the entire measuring method.

Methods in which the distance measuring device can be held freely in the hand are more comfortable for the user: A method for determining a current position of a distance measuring device is disclosed in EP 1 517 117 A1. In this case, a laser scanner of the distance measuring device scans a spatial segment and detects a plurality of previously attached punctiform referencing means therein, on the basis of which a current position of the distance measuring device can be ascertained. On the other hand, the necessity of preparing the measuring environment in a time-consuming manner by distributing the detectable referencing means therein for the measuring method is disadvantageous.

EP 2 669 707 A1 discloses a further method for indirect determination of distances using a handheld distance measuring device, wherein the distances are ascertained here by means of a panoramic image recorded by a camera of the distance measuring device. To execute this method, simultaneously to a measurement of the distance to two spatial points by an image acquisition unit, images are recorded of the environment of the spatial points, which are joined together to form a single panoramic image by means of image stitching, for example, so that a number of pixels between the two spatial points can be ascertained from the images linked to one another. An angle can be ascertained from this number of pixels. The desired distance between the two spatial points can be calculated using the law of cosines. A handheld distance measuring device according to EP 2 669 707 A1 contains for this purpose an image acquisition unit having at least one camera and an image analysis unit for joining together the images and for ascertaining the pixel number. However, this method is essentially only applicable to distances between points on the same plane, for example, on the same wall.

SUMMARY

It is therefore an aspect of the present invention to provide a method which enables indirect ascertainment of distances between two points in a space.

A special aspect is to provide such a method, wherein there is no visual contact between the target points, in particular wherein the target points also do not have to be simultaneously visible from a measurement point.

In particular, it is an aspect of the invention to provide such a method, in which the distance measuring device can be held freely movably in the hand by a user during the entire method.

Furthermore, it is an aspect of the invention to provide such a method, which is applicable without preparations of the measuring environment—in particular without attaching referencing means which can be acquired—and is therefore executable more rapidly.

An additional aspect is to enable distance ascertainment remotely for a plurality of users.

A further aspect of the present invention is to provide a handheld distance measuring device for executing such a method.

At least one of these aspects is achieved by the implementation of the characterizing features of the independent claims. Advantageous embodiments of the invention are found in this case in the respective dependent claims.

A handheld distance measuring device according to the invention having a laser distance meter for measuring distances to target points in an environment, an analysis component for deriving and providing the measured distances, and an image acquisition unit having at least one camera for acquiring images of the environment, is characterized by a control unit having program code for controlling a spatial modeling functionality of the distance measuring device, which is implemented for use with a measurement sequence, in the scope of which a first image and a second image of a region of the environment are acquired from different positions of the distance measuring device, these images having a shared image region, wherein the image acquisition unit assumes different poses, which represent the respective position and alignment of the distance measuring device, during the acquisition of the first image and the second image.

In the scope of the spatial modeling functionality, in reaction to a first user command, from a first position of the distance measuring device, a first image of a first region of the environment is acquired by the image acquisition unit, and a first distance to a first target point in the first region is measured by the laser distance meter in chronological correlation, in particular simultaneously, with the acquisition of the first image. In reaction to a second user command, from a second position of the distance measuring device, a second image of the first region of the environment is acquired by the image acquisition unit, and a second distance to the first target point or to a second target point in the immediate environment of the first target point is measured by the laser distance meter in chronological correlation, in particular simultaneously, with the acquisition of the second image.

The control unit is furthermore embodied for the purpose, in the scope of the spatial modeling functionality, of identifying features of the environment in the images, which are imaged in the shared image region, based on the identified features, the first distance, and the second distance, ascertaining a spatial relationship between the poses, in particular including a stereo base, and based on the first image, the second image, and the spatial relationship, preparing a spatial model of the environment by means of stereo photogrammetry, wherein distances between spatial points in the environment can be ascertained on the basis of the spatial model.

In one embodiment of the handheld distance measuring device according to the invention, the image acquisition unit has a plurality of cameras, and the first image and the second image are each wide-angle images assembled from individual images of the plurality of cameras, wherein the angle range acquired by the images comprises at least 120°, in particular at least 150° or at least 180°.

The cameras of the image acquisition unit are preferably arranged in the form of a hemisphere, and are embodied as wafer-level cameras and/or with backside illumination.

A further embodiment of the distance measuring device contains a display device for displaying the spatial model and spatial points, and an input device for selecting spatial points in the spatial model by way of a user, wherein the control unit is embodied for the purpose of ascertaining a distance between the selected spatial points and the display device is embodied for the purpose of displaying this distance, in particular wherein the display device and the input device are embodied as a touchscreen.

In one embodiment, the prepared spatial model has a plurality of spatial coordinates obtained by means of feature extraction, in particular a point cloud, and also image data of the images recorded by the image acquisition unit.

In one embodiment of the distance measuring device, the control unit is embodied for the purpose, in the scope of the spatial modeling functionality, of joining together a first partial spatial model and a second partial spatial model, which have a shared overlap, to form an overall spatial model, wherein distances between spatial points of both regions of the environment can be ascertained on the basis of the spatial model.

In a special embodiment of the handheld distance measuring device according to the invention, the at least one camera of the image acquisition unit is embodied for recording high-contrast images, and the control unit is embodied for the purpose of identifying features in the high-contrast images in the scope of the spatial modeling functionality.

A further embodiment of the distance measuring device has means for wireless data transmission. In this case, the spatial model is transmittable by means of the wireless data transmission from the distance measuring device to at least one external device, and/or by means of the wireless data transmission, data are transmittable from the distance measuring device to at least one external device, wherein the data have in particular at least coordinates of spatial points and/or image and distance data, and the spatial model can be prepared by a computing unit of the external device based on the data.

One embodiment of the distance measuring device is characterized by a plurality of laser distance meters for measuring distances to a plurality of points in the first region, wherein the control unit is embodied for the purpose of using the distances to the plurality of points for ascertaining the spatial relationship. The various simultaneous distance measurements can be performed in particular by means of laser beams which are emitted divergently, in particular orthogonally.

A further embodiment of the distance measuring device is characterized by an acceleration and/or location sensor, in particular having a gyroscope, an inclination sensor, or a compass, for providing acceleration or location data of the distance measuring device, wherein the control unit is embodied for the purpose of using the acceleration or location data for ascertaining the spatial relationship.

In a further embodiment of the handheld distance measuring device according to the invention, the at least one camera of the image acquisition unit is equipped with a black-and-white image sensor. A black-and-white image sensor is to be understood as a sensor which is designed for acquiring monochromatic images. Such a sensor does not require a color filter and thus avoids calculation errors and information losses in the resulting image. In particular in the event of weak light conditions, this has the advantage that shorter exposure times are possible due to the higher light incidence and therefore higher-contrast images are achieved. As a result thereof, the 3-D spatial model can be created more precisely and therefore higher precision can be achieved in the subsequent distance measurement. To dispense with an antialiasing filter, a sensor having a stochastic pixel distribution or at least a pixel distribution which deviates from the Bayer pattern can also additionally or alternatively be selected.

A method for creating a spatial model of an environment by means of a handheld distance measuring device, which has a laser distance meter and an image acquisition unit, comprises, according to the invention, a measurement sequence having an acquisition of a first image of a first region of the environment by the image acquisition unit from a first position of the distance measuring device, in chronological correlation, in particular simultaneously, with the acquisition of the first image, a measurement of a first distance to a first target point in the first region of the environment by the laser distance meter, an acquisition of a second image of the first region of the environment by the image acquisition unit from a second position, which deviates from the first position of the distance measuring device, and in chronological correlation, in particular simultaneously, with the acquisition of the second image, a measurement of a second distance to the first target point or to another target point in the immediate environment of the first target point, wherein the first image and the second image have a shared image region, and the image acquisition unit assumes different poses, which represent the respective position and alignment of the distance measuring device, during the acquisition of the first image and the second image. In addition, in the scope of the method according to the invention features of the environment, which are imaged in the shared image region, are identified, in particular extracted, in the images, based on the identified features, the first distance, and the second distance, a spatial relationship between the poses is ascertained, in particular including a stereo base, and based on the first image, the second image, and the spatial relationship, a spatial model of the environment is prepared by means of stereo photogrammetry, wherein distances between spatial points of the environment can be ascertained on the basis of the spatial model.

In one embodiment of the method, the prepared spatial model is a first partial spatial model, and the measurement sequence additionally has an acquisition of a third image of a second region of the environment by the image acquisition unit from a third position of the distance measuring device, in chronological correlation, in particular simultaneously, with the acquisition of the third image, a measurement of a third distance to a second target point in the second region of the environment by the laser distance meter, an acquisition of a fourth image of the second region of the environment by the image acquisition unit from a fourth position, which deviates from the third position of the distance measuring device, and in chronological correlation, in particular simultaneously, with the acquisition of the fourth image, a measurement of a fourth distance to the second target point or to another target point in the immediate environment of the second target point, wherein the third image and the fourth image have a shared image region, and the image acquisition unit assumes different poses, which represent the respective position and alignment of the distance measuring device, during the acquisition of the third image and the fourth image.

In addition, in the scope of this embodiment of the method features in the environment, which are imaged in the shard image region, are identified, based on the identified features, the third distance, and the fourth distance, a spatial relationship between the poses is ascertained, in particular a stereo base, based on the third image, the fourth image, and the spatial relationship, a second partial spatial model of the environment is prepared, and an overall spatial model is assembled from the first partial spatial model and the second partial spatial model, which have a shared overlap, wherein distances between spatial points of both regions of the environment can be ascertained on the basis of the spatial model.

In one embodiment, the spatial model has a plurality of spatial coordinates obtained by means of feature extraction, in particular a point cloud, and also image data of the images recorded by the image acquisition unit.

In a further embodiment of the method according to the invention, to identify additional spatial points in the environment, at least one additional image is acquired, in particular with a measurement of at least one additional distance, wherein the additional image has a shared image region in each case with the first or second image, in particular wherein the spatial model is also prepared based on the additional image, or is supplemented based on the additional image.

In a further embodiment of the method according to the invention, the spatial model is displayed on a display device of the distance measuring device, and a distance between two spatial points, which are selected by a user by means of an input device, is ascertained by a control unit of the distance measuring device and displayed on the display device, in particular wherein the distance measuring device has a touchscreen, which comprises the display device and the input device.

A further embodiment of the method is characterized in that the distance measuring device has means for wireless data transmission, and the spatial model is transmitted by means of the wireless data transmission from the distance measuring device to at least one external device, or is prepared based on data transmitted by means of the wireless data transmission from the distance measuring device to an external device, in particular wherein the spatial model is displayed on the external device and a distance between two reference points selected by a user is ascertained by a computing unit of the external device and displayed thereon.

In a further embodiment of the method, to ascertain the spatial relationship, distances to a plurality of points in the first region, which are measured by a plurality of laser distance meters of the distance measuring device, are used.

In a further embodiment of the invention, to ascertain the spatial relationship, acceleration or location data, which are provided by an acceleration and/or location sensor of the distance measuring device, are used, in particular wherein the acceleration and/or location sensor comprises a gyroscope, an inclination sensor, or a compass.

A computer program product according to the invention, having program code which is stored on a machine-readable carrier, in particular on an electronic data processing unit implemented as a control unit of the distance measuring device according to the invention, for executing at least one of the following steps of the method according to the invention:

identifying features in the environment, which are imaged in the shared image region, ascertaining a spatial relationship between the poses, in particular a stereo base, based on the identified features, the first distance, and the second distance, and preparing a spatial model of the environment, based on the first image, the second image, and the spatial relationship.

A further aspect of the invention relates to a method for indirectly ascertaining a distance between two target points.

A method for ascertaining a distance between a first target point and a second target point by means of a handheld distance measuring device, which has a laser distance meter and an image acquisition unit having at least one camera, contains a measurement sequence comprising a measurement of a first distance to the first target point from a first position of the distance measuring device by means of emission of a laser beam from the laser distance meter in a first emission direction, a measurement of a second distance to the second target point from a second position of the distance measuring device by means of emission of a laser beam from the laser distance meter in a second emission direction, and an acquisition of a series of images, which has at least one first target image and one second target image and optionally bridging images, by at least one camera of the distance measuring device.

In this case, the first target image is acquired in chronological correlation, in particular simultaneously, with the measurement of the first distance, and the second target image is acquired in chronological correlation, in particular simultaneously, with the measurement of the second distance, in each case successive images of the series have a shared image region, and the at least one camera assumes different poses, which represent the position and alignment of the distance measuring device, during the acquisition of the images.

According to this aspect of the invention, the respective pose of the distance measuring device is ascertained for each of the acquired images, a spatial relationship between a first target pose assumed during the measurement of the first distance and a second target pose assumed during the measurement of the second distance is ascertained, and the distance between the first target point and the second target point is ascertained with the aid of the spatial relationship.

In one embodiment of the method according to the invention, the spatial relationship between the first target pose and the second target pose is ascertained at least in three translational degrees of freedom and two rotational degrees of freedom.

In a further embodiment of the method according to the invention, the spatial relationship comprises an offset between the first position and the second position of the distance measuring device and a spatial angle between the first emission direction and the second emission direction.

In particular, the distance between the first target point and the second target point is ascertained from the first distance, the second distance, the distance between the first position and the second position, the direction of the distance, and the spatial angle.

In a further embodiment of the method according to the invention, reference points in the environment, which are imaged in at least one shared image region, are identified based on the series of images, and the poses are ascertained based on the identified reference points by means of resection.

In a special embodiment of this method, the identified reference points are stored for executing further measurement sequences in the same environment, in particular in a point cloud.

In a further embodiment of the method according to the invention, at least one bridging image is recorded, wherein in each case a scaling distance is measured by the laser distance meter in chronological correlation, in particular simultaneously, with the recording of bridging images of the series of images, and the measured scaling distances are used for ascertaining the respective intermediate poses, in particular for scaling a position of the distance measuring device.

A further embodiment of the method according to the invention includes the usage of acceleration or location data, which are provided by an acceleration and/or location sensor of the distance measuring device, for ascertaining the poses, in particular wherein the acceleration and/or location sensor comprises a gyroscope, an inclination sensor, or a compass.

A handheld distance measuring device according to the invention has a laser distance meter for measuring distances to target points by means of a laser beam emitted in an emission direction, an analysis component for deriving and providing the measured distances, an image acquisition unit having at least one camera for acquiring images of an environment, and a control unit having program code for controlling an image acquisition and analysis functionality of the distance measuring device. In the scope of the image acquisition and analysis functionality, a series of at least two images can be acquired by the image acquisition unit, this series having at least one first target image and one second target image and optionally bridging images, and having a shared image region in each case in the successive images of the series, wherein the image acquisition unit acquires the first target image in chronological correlation, in particular simultaneously, with the measurement of the first distance and acquires the second target image in chronological correlation, in particular simultaneously, with the measurement of the second distance, in each case successive images of the series have a shared image region, and the image acquisition unit assumes different poses which represent the position and alignment of the distance measuring device, during the acquisition of the images.

According to the invention, in the scope of the image acquisition and analysis function of the distance measuring device, the respective pose of the distance measuring device can be ascertained by means of photogrammetry for each of the acquired images, and a spatial relationship between a first target pose assumed during the measurement of the first distance and a second target pose assumed during the measurement of the second distance can be ascertained, and the analysis component is embodied for the purpose of ascertaining the distance between the first target point and the second target point with the aid of the spatial relationship.

In one embodiment of the distance measuring device according to the invention, the image acquisition and analysis functionality is embodied for the purpose, based on the series of images, of identifying reference points in the environment, which are imaged in at least one shared image region, by means of intersection and ascertaining the poses based on the identified reference points by means of resection.

In a further embodiment of the distance measuring device according to the invention, it has a storage unit, which is embodied to store identified reference points, in particular in the form of a point cloud.

The storage unit is embodied in this case in particular for providing the stored reference points for the image acquisition and analysis functionality, in particular wherein the image acquisition and analysis functionality is embodied for the purpose of ascertaining the poses based on stored reference points, and/or for a display screen of the distance measuring device to display the reference points, in particular as part of a spatial model of the environment.

In a further embodiment of the distance measuring device according to the invention, the image acquisition unit is embodied for the purpose of recording at least one bridging image in the scope of the image acquisition and analysis functionality, wherein the laser distance meter is embodied for the purpose, in chronological correlation, in particular simultaneously, with the recording of bridging images, of measuring a scaling distance in each case, and the image acquisition and analysis functionality is embodied for the purpose of ascertaining the respective intermediate poses with the aid of the measured scaling distances, in particular wherein an ascertained position of the distance measuring device is scalable by means of the corresponding scaling distance.

A further embodiment of the distance measuring device according to the invention has an image acquisition unit having at least two, in particular three cameras, which is embodied for the purpose of acquiring images in the direction of an emission direction, acquiring target images as wide-angle images, in particular having an angle of at least 120°, and/or acquiring images using multiple cameras simultaneously.

A further embodiment of the distance measuring device according to the invention has an acceleration and/or location sensor, in particular a gyroscope, an inclination sensor, or a compass, for providing current acceleration and/or location data of the distance measuring device to the image acquisition and analysis functionality, wherein the image acquisition and analysis functionality is embodied for the purpose of ascertaining the poses with the aid of the acceleration or location data.

A further embodiment of the distance measuring device according to the invention has:
- a target search camera having a zoom functionality,
- input means, in particular a keypad, for selecting functions, and/or
- a display screen, which is touch-sensitive in particular, for displaying images recorded by means of the at least one camera of the image acquisition unit, a spatial model, in particular a point cloud, measured distances, calculated distances, and/or a live image recorded by the target search camera.

The invention additionally comprises a computer program product having program code which is stored on a machine-readable carrier, in particular on an electronic data processing unit implemented as a control unit of a distance measuring device according to the invention, for executing at least the following steps of the method according to the invention:
- ascertaining the respective pose of the distance measuring device for each of the acquired images,
- ascertaining the spatial relationship between the first target pose and the second target pose, and
- ascertaining the distance between the first target point and the second target point with the aid of the spatial relationship.

BRIEF DESCRIPTION OF THE DRAWINGS

The handheld distance measuring device according to the invention and the method according to the invention are described in greater detail hereafter solely as examples on the basis of specific exemplary embodiments, which are schematically illustrated in the drawings, wherein further advantages of the invention will also be discussed. In the specific figures:

FIG. 1 shows a handheld distance measuring device of the type in question having a laser distance meter;
FIG. 2 shows a handheld distance measuring device according to the invention in a longitudinal sectional view;
FIGS. 4a-c show a fourth example embodiment of a handheld distance measuring device according to the invention having a further example camera arrangement;
FIGS. 5a-c show a fifth example embodiment of a handheld distance measuring device according to the invention having a further example camera arrangement;
FIGS. 7a-c show steps of a first example embodiment of the method according to the invention for preparing a spatial model;
FIG. 8 shows a flow chart of the embodiment of the method according to FIGS. 7a-c;
FIG. 12 shows a spatial model, displayed on a display unit of an example embodiment of a handheld distance measuring device according to the invention and on an external device.

DETAILED DESCRIPTION

Figure 3A:
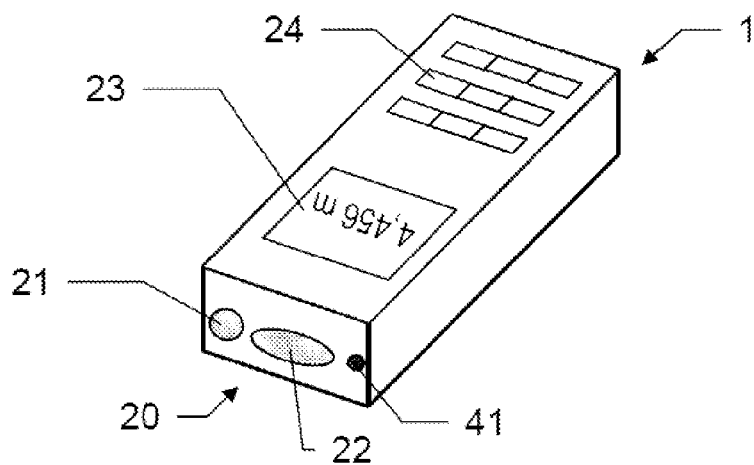
FIGS. 3a-c show three example embodiments of a handheld distance measuring device according to the invention having various camera arrangements.

FIG. 1 shows a handheld distance measuring device 1 of the type in question for measuring distances in an external view. It has a housing, in which the required electronic components are arranged. The housing is implemented in this case so that the distance measuring device 1 can be held in the hand and can also be applied or fitted in a defined manner to a point to be measured. For this purpose, corresponding application edges or fitting elements which can be folded out or plugged on can be attached to the housing, as they are described, for example, in WO 02/50564. The distance measuring device 1 contains, on its front side, a laser distance meter 20 having a laser emission unit 21 and a laser receiving unit 22, which have optical openings in the housing. A display device 23 in the form of a display screen and input means 24 in the form of a keypad are located on the upper side of the device. In addition, a target search camera (not shown here) having a zoom functionality can be provided for recording images in the direction of the emission direction, which can be displayed on the display device 23.

According to the invention, the laser emission unit 21 emits a laser beam 7 toward a target point 10 on a wall. This wall has a naturally rough surface, from which optical beams are reflected in a scattered manner. A part of the scattered reflected beams 7' of the laser beam 7 is collected by the laser receiving unit 22, detected, and converted into an electrical signal. The signal is analyzed by an electronic circuit in a manner known per se to determine the digital value of the distance 13. For example, phase measurement or runtime measurement can be used for the distance ascertainment. In this case, the extension between the laser receiving unit 22 and a measurement fitting is also taken into consideration. The value of the measured distance 13 which is digitally determined by the analysis is then provided to a user by the display device 23.

FIG. 2 shows a longitudinal section through an exemplary embodiment of a handheld distance measuring device 1 according to the invention. The distance measuring device 1 contains a laser distance meter 20 for measuring distances by means of a laser beam 7 emitted in the emission direction 8. Furthermore, a display screen 23 and input means 24 are shown.

The handheld distance measuring device 1 additionally has an image acquisition unit 40 having at least one camera for acquiring images of the environment.

An analysis component 25, an inclination and acceleration sensor 26, and a control unit 27 are shown as internal components. The control unit 27 contains program code for executing a functionality for preparing a spatial model on the basis of measured distances and acquired images of the environment. In addition, an energy source (not shown here) is contained in the distance measuring device 1, in particular a battery or an accumulator cell, which provides electrical energy for the electrically operated components of the distance measuring device 1.

A digitally provided distance value—as is currently typical in the case of optically measured distances—can be stored, further processed, or transmitted by the analysis component 25 of the device and displayed on the display screen 23 to a user.

Figure 3B:
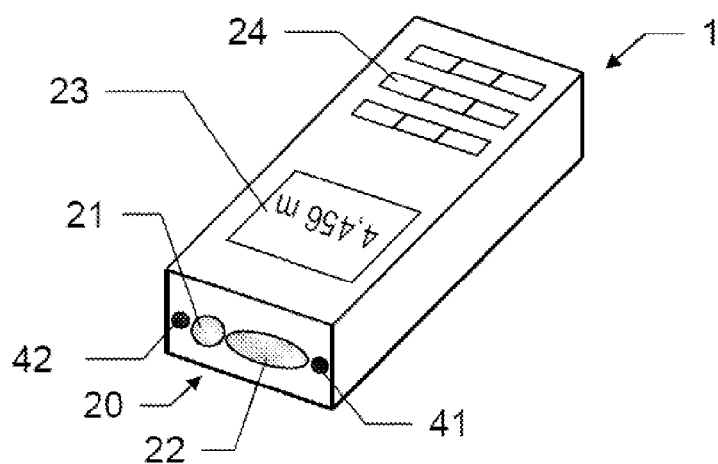
Figure 3C:
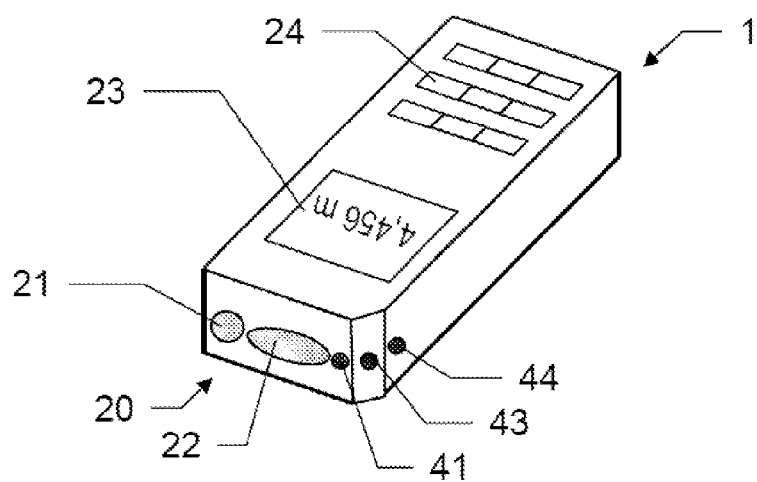

FIGS. 3a to 3c show three exemplary embodiments of a handheld distance measuring device 1 according to the invention having three exemplary embodiments of the image acquisition unit 40.

FIG. 3a shows a handheld distance measuring device 1 having a single camera 41, which is arranged adjacent to the laser emission unit 21 and the laser receiving unit 22 of the laser distance meter 20.

FIG. 3b shows a handheld distance measuring device 1 having a first camera 41, which is arranged on one side of the laser emission unit 21 and the laser receiving unit 22, and a second camera 42, which is arranged on the other side.

FIG. 3c shows a handheld distance measuring device 1 having three cameras 41, 43, 44, which are arranged on the same side of the laser distance meter.

The cameras 41-44 in the image acquisition units shown in FIGS. 3a and 3b are embodied in particular such that they make it possible to create a wide-angle image by simultaneous recording of an image. Diverse further camera arrangements, which cannot be shown here for reasons of space, are implementable, in particular multiple cameras can be arranged in each case on both sides of the laser distance meter 20, or (additionally or alternatively) cameras can be arranged above and/or below the laser distance meter 20.

FIGS. 4a to 4c and 5a to 5c show two further exemplary embodiments of a handheld distance measuring device 1 according to the invention, which each has a further exemplary form of an image acquisition unit 40 according to the invention.

The image acquisition unit 40 shown in FIGS. 4a to 4c has a first camera 41, which is aligned along the emission direction of the laser distance meter 20, for recording images of the measurement region. In addition, the image acquisition unit 40 has a plurality of further cameras 45—ten cameras 45 in the example shown—which are arranged in a circle around the first camera 41 and are aligned in different target directions. It is thus possible to assemble a wide-angle image from the individual images.

The image acquisition unit 40 shown in FIGS. 5a to 5c is embodied in the form of a hemisphere, on the surface of which a plurality of cameras 45 are arranged, for example, 18 cameras. It is also possible using this embodiment to assemble a wide-angle image from a plurality of simultaneously recorded individual images, wherein the recording angle can be up to 180° or even greater.

Embodiments having two hemispheres are also possible, which are attached laterally to the distance measuring device 1, for example, or one hemisphere above and one below the device.

The cameras 41-45 of all above-described embodiments can advantageously be embodied as wafer-level cameras (WLC). WLCs have an image sensor, for example, a CMOS image sensor, lenses, and spacers, which are produced in the wafer level, stacked, and joined together to form a single part. The camera is then housed as an integrated overall system on the surface of a semiconductor plate. WLCs are particularly mechanically stable and are only to be calibrated once during the manufacturing.

In particular, cameras having so-called backside illumination can also be used, for example, based on the OmniBSI-2™ from OmniVision®.

Cameras 41-45 of all above-described embodiments can also advantageously be embodied for recording high-contrast images (or high dynamic range images (HDRI)). In particular, for this purpose the cameras have digital image sensors having high dynamic range and are equipped, for example, with the chip OV10626 from OmniVision® or comparable products. This technology, which is heretofore known, for example, from camera systems for use as assistance systems in motor vehicles, enables the simultaneous acquisition of multiple illumination stages and is therefore suitable for simultaneously imaging both sunlit regions and also regions lying in shadow with high contrast, i.e., avoiding overexposure and underexposure. The feature identification and feature extraction can advantageously thus be optimized in the entire image region, even in the event of difficult light conditions.

Alternatively, the cameras can also be embodied for rapidly recording exposure series, or the image acquisition unit 40 has at least one camera for recording images of bright regions and at least one camera for recording images of dark regions.

Figure 6A:
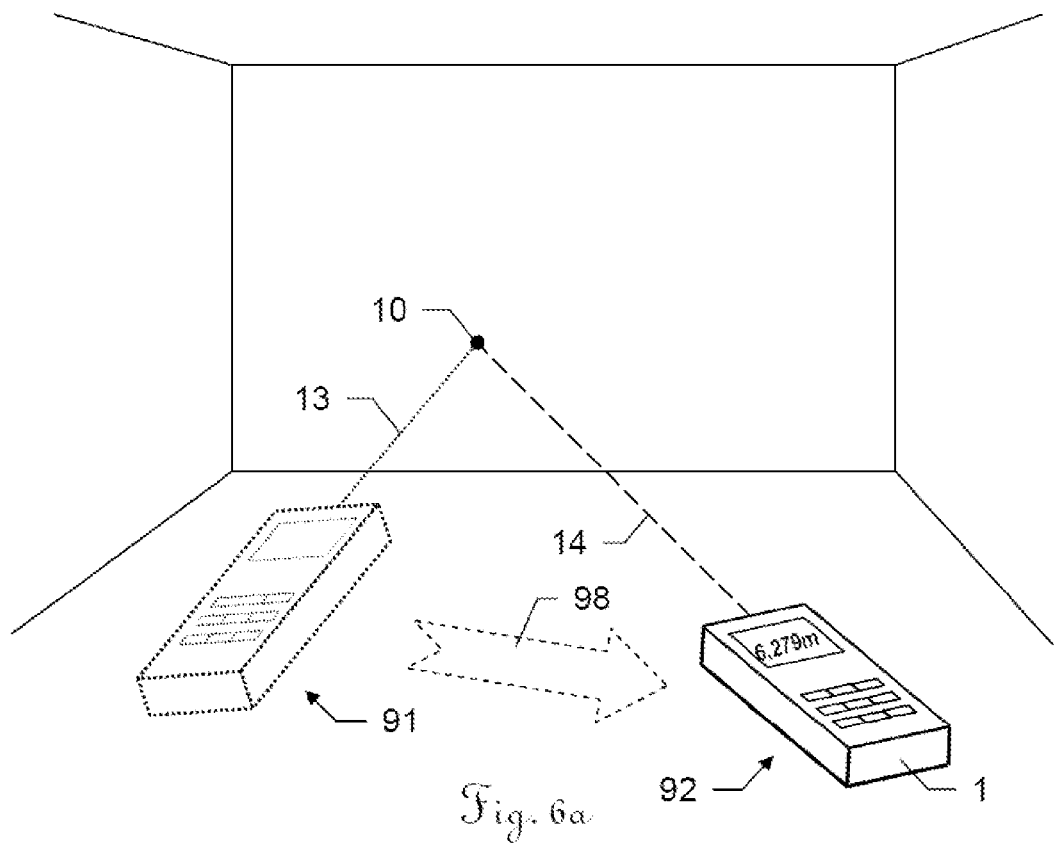
FIGS. 6a-b show a spatial relationship to be ascertained between the poses of the camera of a handheld distance measuring device.
Figure 6B:
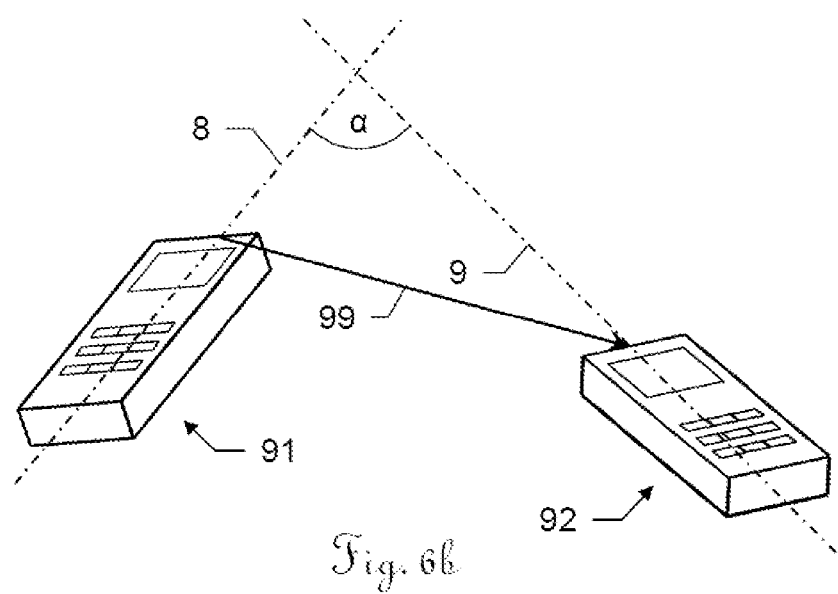

FIGS. 6a and 6b illustrate the fundamental principles of an exemplary method. Firstly, a first distance 13 to a target point 10 is measured by means of the distance measuring device 1 from a first position. The distance measuring device 1 is subsequently moved by the user into another position and again aligned on the target point 10. A second distance 14 to the target point 10 is then measured.

According to the invention, in the scope of the method, the spatial relationship 98 between the first target pose 91 and the second target pose 92 of the distance measuring device 1 is ascertained, to subsequently be able to create a three-dimensional spatial model by means of feature extraction from recorded images of the environment.

FIG. 6b shows the spatial relationship 98 from FIG. 6a in greater detail. The distance measuring device 1 is shown in its first and its second target poses 91, 92. The spatial relationship 98 to be ascertained between the two target poses 91, 92 includes, on the one hand, the offset 99. This is the distance and the direction between the distance measuring device 1, or the laser distance meter of the distance measuring device 1, in the first target pose 91 and the same device in the second target pose 92. On the other hand, the spatial relationship includes a spatial angle of the alignment of the distance measuring device 1 during the two distance measurements. This is the angle α between the first emission direction 8 and the second emission direction 9.

Figure 7A:
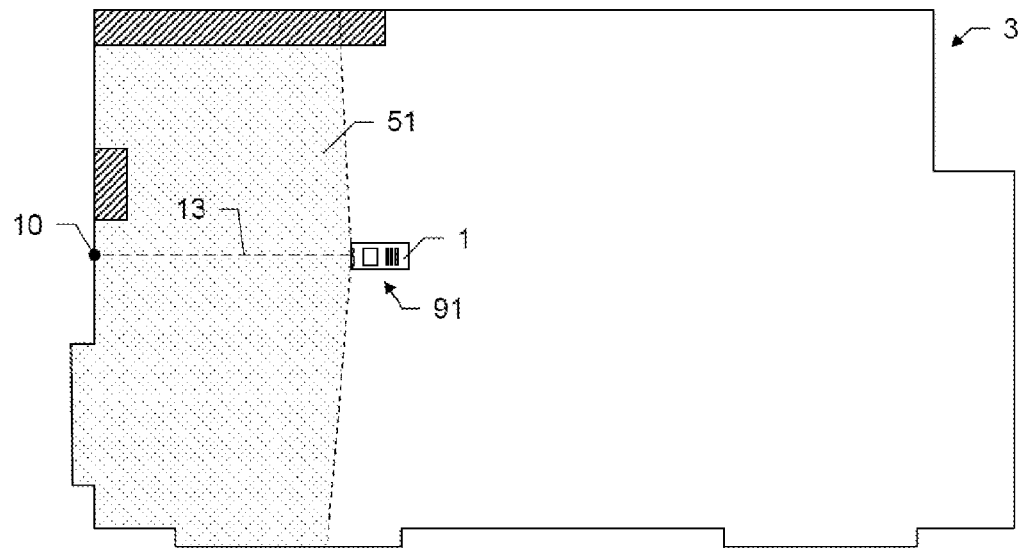
Figure 7B:
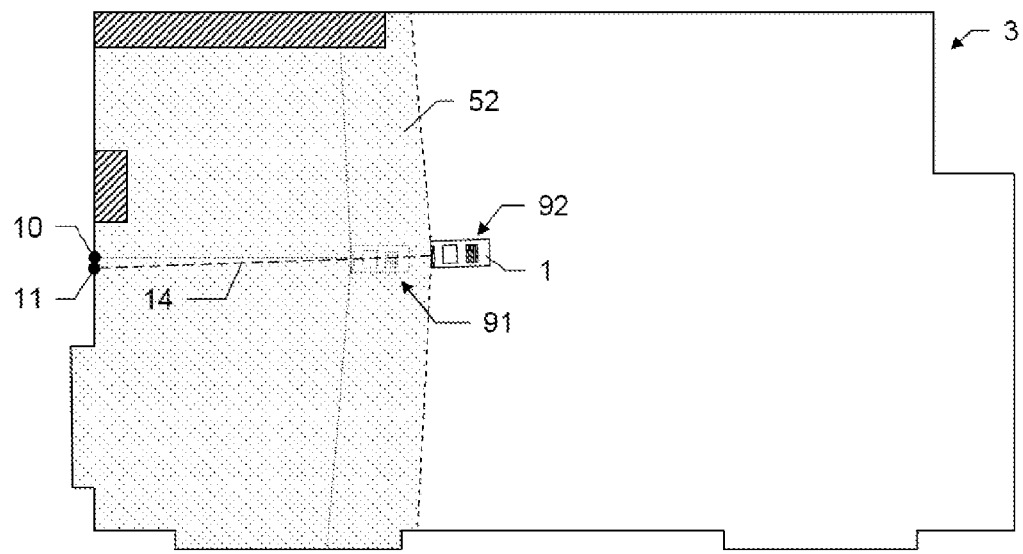

FIGS. 7a to 7c illustrate steps of a measurement sequence of an exemplary embodiment of a method according to the invention for creating a spatial model.

FIG. 7a shows the distance measuring device 1 in a measurement environment 3 in a top view. The measurement environment 3 is an interior here, of which a spatial model is to be prepared. The recording of a first image 51 of a region of the interior by the image acquisition unit 40 of the distance measuring device 1 is shown. This is embodied, for example, according to the embodiments shown in FIG. 4a-c or 5a-c and is in particular embodied for the purpose of recording wide-angle images having an angle range of approximately 180°. Simultaneously with the recording of the first image 51, a distance 13 to a point 10 on a wall of the recorded region of the environment 3 is measured by the laser distance meter 20 of the distance measuring device 1.

Of course, the distance measuring device 1 can also have multiple laser distance meters, which measure distances simultaneously in various directions to various points in the region recorded by the image acquisition unit 40. This can be—presuming a corresponding angle of the image recording—orthogonal to the direction shown here, for example, thus upward, downward, left, and also right.

FIG. 7b again shows the distance measuring device 1 in a measurement environment 3 in a top view, this time during the recording of a second image 52 of the same region of the interior. Simultaneously with the recording of the second image 51, a distance 14 to a point 11 on the same wall of the recorded region of the environment 3 is measured by the laser distance meter 20 of the distance measuring device 1. In particular, this point 11 can be the same point 10 as in the first measurement, however, it can also be located in the immediate environment of the first point, in particular at least on the same plane.

In FIG. 7c, this is shown in a spatial illustration: the target point 10 is first targeted and measured from a first position of the distance measuring device 1 by means of a laser beam 7 emitted in a first emission direction 8, and subsequently is targeted and measured from a second position by means of a laser beam 7 emitted in a second emission direction 9. Simultaneously to the distance measurements, an image 51, 52 of the environment is recorded in each case by the image acquisition unit in a first pose 91 and a second pose 92.

Based on the recorded images 51, 52 and the measured distances 13, 14, features in the environment can be identified, which are imaged in the image region shared by the two images 51, 52. Based on the identified features, i.e., in particular by feature extraction, at the first distance and the second distance, a spatial relationship between the poses 91, 92 can then be ascertained, for example, having a stereo base between the positions of the image acquisition unit, so that a three-dimensional spatial model can be prepared.

FIG. 8 illustrates the described exemplary method 100 on the basis of a flow chart.

In a first step, the user aligns the device on a point and gives a command 101 for measuring, for example, by actuating a corresponding button of the device or by selecting a corresponding menu item on a touch-sensitive display screen.

Subsequently, a first image 51 of a first region of the environment is recorded and simultaneously a first distance 13 to the targeted point in the region is measured fully automatically by the distance measuring device.

In a second step, the user changes the position of the device, aligns it again on the point, and gives a further command 102 for measuring.

A second image 52 of the region of the environment is then recorded and simultaneously a second distance 14 to the targeted point (essentially the same point as in the first measurement) in the region is measured fully automatically by the distance measuring device.

The two images 51, 52 have a shared image region 56, in which features can be identified. The spatial relationship 98 can be ascertained based thereon. This is assisted by the measured distances 13, 14, so that this spatial relationship 98 can be ascertained with a precision in the sub-millimeter range in the event of optimum conditions.

Subsequently, based on the first and the second images 51, 52 and on the ascertained spatial relationship 98 of the poses 91, 92, a spatial model 30 of the environment is prepared, so that distances between spatial points of the environment can be ascertained on the basis of this spatial model 30.

In particular, in the scope of the method, images can be progressively acquired by the image acquisition unit after the first step, to ascertain and display to the user whether the present second position and alignment of the device is suitable for executing the method, for example, whether the shared image region 56 of the first and the second images is sufficient, or whether the currently targeted point corresponds with the point of the first distance measurement to a sufficient extent.

Figure 9A:
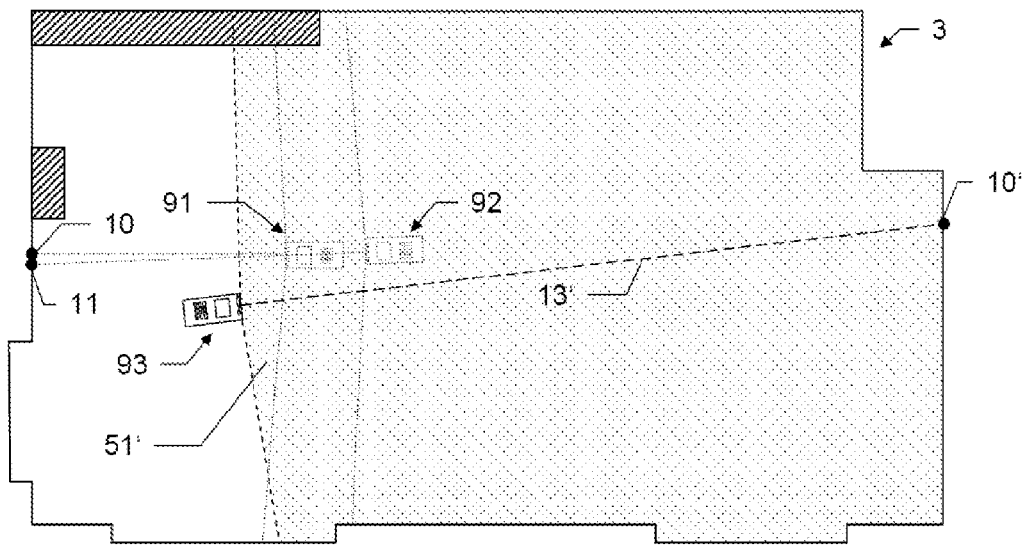
FIGS. 9a-b show additional steps of a further example embodiment of the method according to the invention.
Figure 9B:
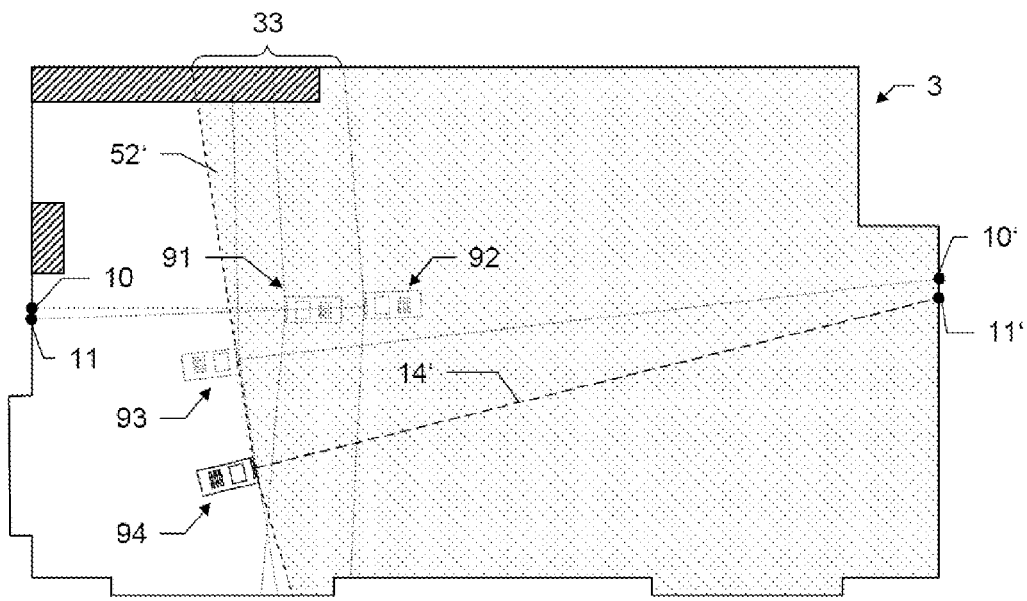

FIGS. 9a and 9b show an optional supplementation of the method according to the invention. In each case (as in FIGS. 7a and 7b), the distance measuring device 1 is shown in the measurement environment 3 in a top view.

FIG. 9a shows, similarly to FIG. 7a, the recording of a first image 51' of a second region of the interior by the image acquisition unit 40 of the distance measuring device 1 in a third pose 93. The first and the second regions of the environment 3 partially overlap in this case. Simultaneously with the recording of the first image 51' of the second region, a distance 13' to a point 10' on a wall of the second region of the environment 3 is measured by the laser distance meter 20 of the distance measuring device 1.

FIG. 9b shows the distance measuring device 1 during the recording of a second image 52' of the second region of the interior in a fourth pose 94. Simultaneously with the recording of the second image 51', a distance 14' to a point 11' on the same wall of the recorded region of the environment 3 is measured by the laser distance meter 20 of the distance measuring device 1. In particular, this point 11' can be the same point 10' as in the first measurement, however, it can also be located in the immediate environment of the first point, in particular at least on the same plane.

Based on the recorded images 51', 52' and the measured distances 13', 14', features can be identified in the environment, which are imaged in the image region shared by the two images 51', 52'. Based on the identified features, the first distance, and the second distance, a spatial relationship between the third pose and the fourth pose 94 can then be ascertained, so that a second partial spatial model can be prepared. This partial spatial model has an overlap 33 with the spatial model prepared according to the method shown in FIGS. 7a-c, so that the two parts can be unified based on the features identifiable in the overlap 33 to form an overall spatial model.

Figure 10:
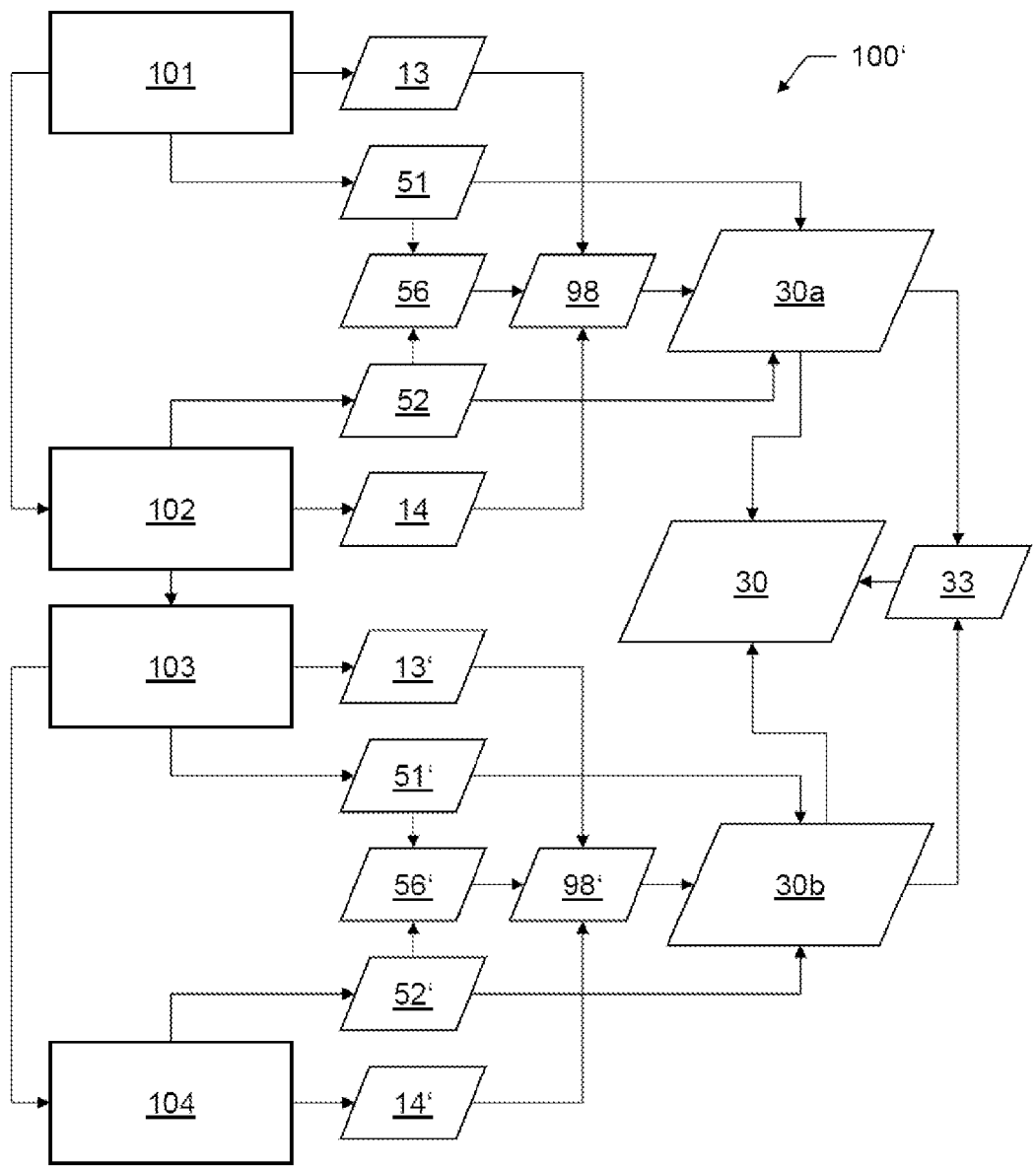
FIG. 10 shows a flow chart of the embodiment of the method according to FIGS. 9a-b.

FIG. 10 illustrates an exemplary method 100', which is supplemented as described in FIGS. 9a and 9b, on the basis of a further flow chart.

Firstly—as described with reference to FIG. 8—the first step is executed using a first user command 101 and the second step is executed using a second user command 102 for a first region, wherein as a result a first partial spatial model 30a is prepared.

In a third step, the user aligns the device on a point in another region and again gives a command 103 for measuring, for example, by actuating a corresponding button of the device or by selecting a corresponding menu item on a touch-sensitive display screen.

Subsequently, a first image 51' of the second region of the environment is recorded and simultaneously a first distance 13' to the targeted point in the second region is measured fully automatically by the distance measuring device.

In a fourth step, the user changes the position of the device, aligns it again on the point, and gives a further command 104 for measuring.

Subsequently, a second image 52' of the second region of the environment is recorded and simultaneously a second distance 14' to the targeted point in the region is measured fully automatically by the distance measuring device.

The two images 51', 52' have a shared image region 56', in which features can be identified. The spatial relationship 98' can be ascertained based thereon. This is assisted by the measured distances 13', 14', so that this spatial relationship 98' can be ascertained with a precision in the sub-millimeter range in the event of optimum conditions.

Subsequently, based on the first and the second images 51', 52' and on the ascertained spatial relationship 98' of the poses, a partial spatial model 30b of the second region of the environment is prepared.

The first partial spatial model 30a and the second partial spatial model 30b have an overlap 33 with one another. Based on the features identifiable in the overlap 33, the two partial spatial models 30a, b can be unified to form an overall spatial model 30, so that distances between spatial points of both regions of the environment can be ascertained on the basis of this spatial model 30.

Figure 11A:
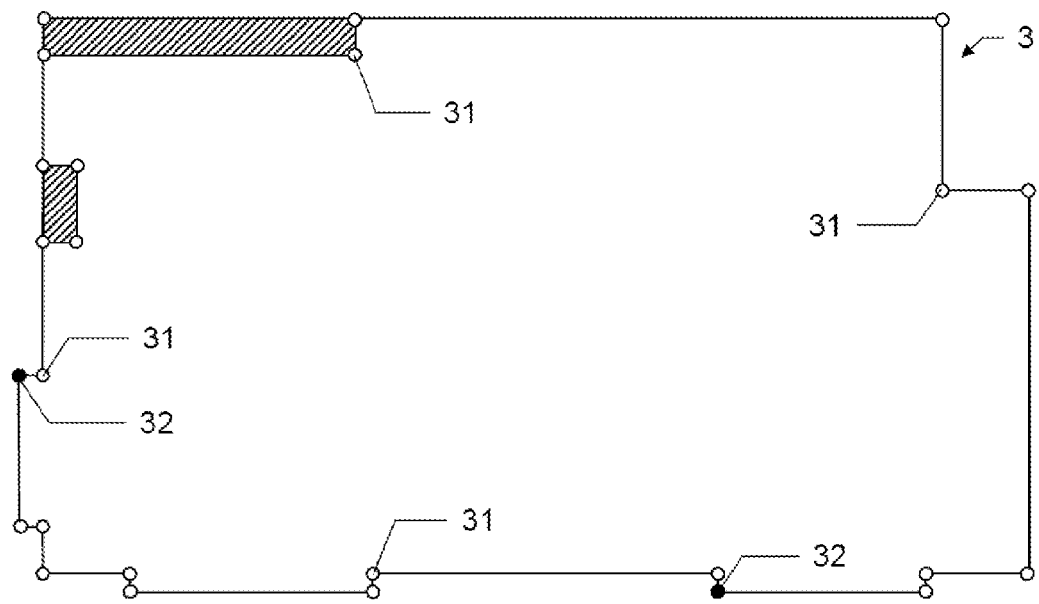
FIGS. 11a-b show spatial points in a surveyed environment and method steps for acquiring additional spatial points in the measured environment.

FIG. 11a shows a top view of an exemplary environment having spatial points 31, the position of which can be displayed in a spatial model created according to the invention. In this example, these are all corner points of the interior. Two corner points 32 are not acquired by the spatial model, since they lie behind corners, and were therefore not imaged in the images of the image acquisition unit.

Figure 11B:
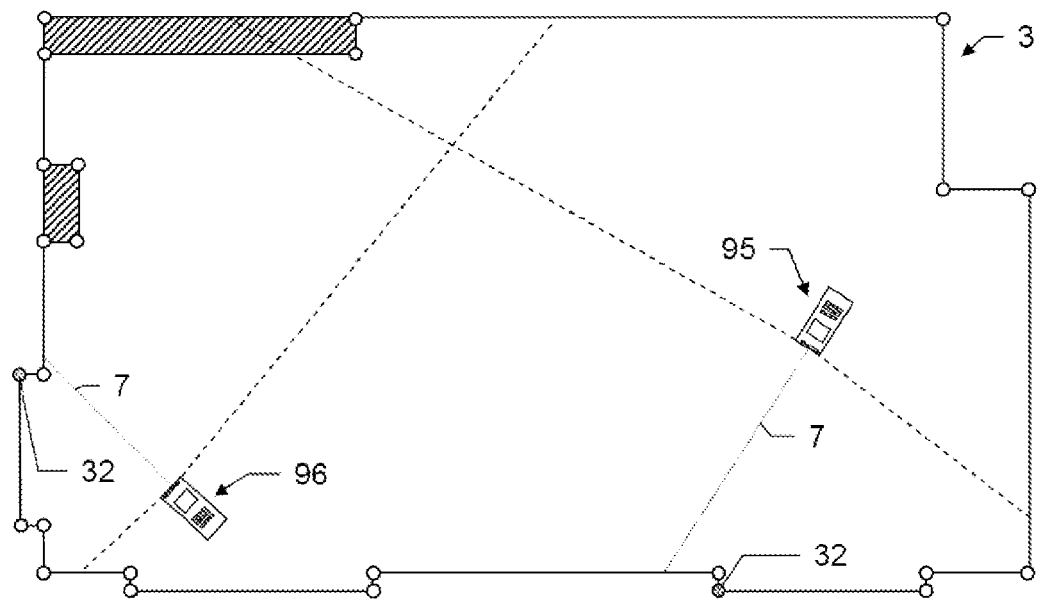

FIG. 11b shows as an example how such additional spatial points 32 are to be supplemented in the spatial model. The distance measuring device 1 is aligned so that the corresponding point 32 is imaged in an image of the image acquisition unit and—in particular triggered by a user command—a further image of a region of the interior 3 is recorded—optionally with a further distance measurement by means of a laser beam 7 to a point on a surface of the interior 3, which is already acquired in the spatial model. The respective poses 95, 96 of the image acquisition unit can thus be ascertained, and the spatial model can be supplemented with the items of information contained in the further images, including the further spatial points 32.

FIG. 12 shows an exemplary spatial model 30, as is displayed on a touchscreen 28 of a handheld distance measuring device 1 according to the invention. The illustrated distance measuring device 1 has a hemispherical image acquisition unit 40 according to FIGS. 5a-c, and also means for transmitting spatial model data to an external device such as a personal computer 2 by means of a wireless connection 29. This can be, for example, a Bluetooth or Wi-Fi connection.

By marking two points (for example, corner points) in the spatial model 30 on the touchscreen 28 of the distance measuring device 1 or using a mouse of the computer 2, a user can have the distance between the two points calculated and displayed. The spatial model data can also be transmitted to a cloud in the Internet and thus distances in the environment can be ascertained on the basis of the spatial model 30 simultaneously by many users.

The spatial model 30, which is shown as two-dimensional here for reasons of comprehensibility, can also be displayed in a three-dimensional manner in reality, of course. In particular, the acquired images can be laid over a grid of ascertained point coordinates. Alternatively, only the geometry without special texture can be displayed. Zooming in and out is possible in both cases, as is rotating the view.

It is optionally possible to perform further measurements in the spatial model 30, for example, area calculations. A user can thus have the area of a space displayed in square meters in a simple manner. Roof pitches can automatically be recognized in the model and incorporated into the calculation as needed.

Furthermore, it is possible to load an existing spatial model 30 into the distance measuring device, and to perform further measurements in the corresponding space, which are automatically referenced in relation to the known spatial points by recording a further image and which supplement the spatial model 30. Subsequent changes in the environment, for example, boreholes in a wall, can thus be incorporated in the existing spatial model 30, possibly without having to repeat all steps of the method.

A method for indirectly ascertaining a distance between two target points by means of a handheld distance measuring device is described hereafter as a second aspect of the invention.

Figure 13:
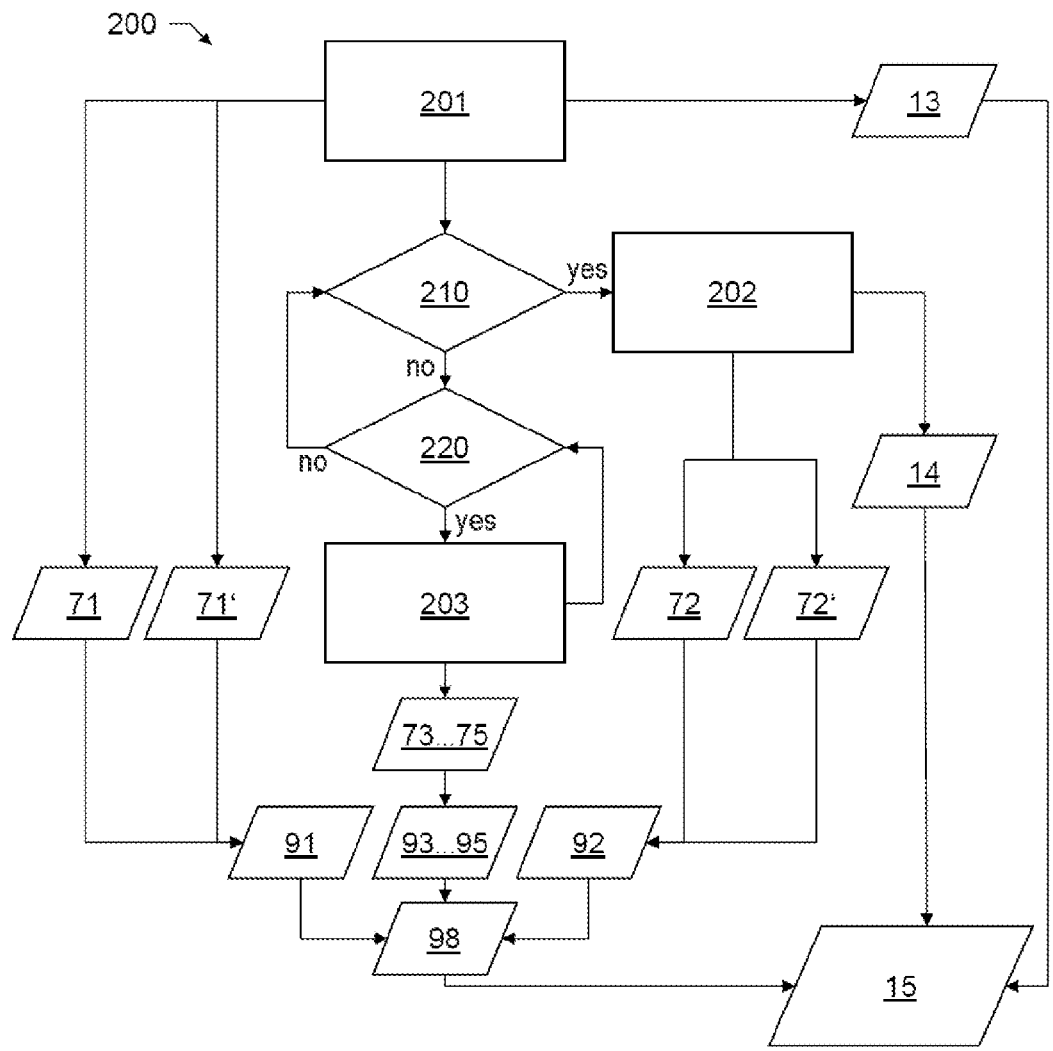
FIG. 13 shows a flow chart of the embodiment of a method for indirectly measuring a distance.

FIG. 13 shows, on the basis of a flow chart, an exemplary embodiment of a method 200 for ascertaining a distance 15 between two target points, in which a spatial relationship 98 between two target poses 91, 92 can be ascertained by recording additional "bridging images" 73-75. In this case, in a step 201, a first distance measurement is triggered and simultaneously (or essentially simultaneously) a first target image 71 is recorded on a distance measuring device according to the invention, which is aligned on a first target point. Subsequently, to ascertain the pose 91, the distance measuring device is again aligned from another position (essentially) on the same point and a second image 71' is recorded. The measured distance 13 is stored and a current first target pose 91 of the distance measuring device is ascertained from the target image 71 and the further image 71' and optionally distances measured simultaneously with the image recordings.

Subsequently, the distance measuring device is aligned by the user on the second target point. In this case, it is continuously checked in step 210 whether a further distance measurement is triggered. As long as this is not the case, it is continuously checked in step 220 whether a new pose 93-95 of the distance measuring device must be ascertained by recording a bridging image.

If a new pose has to be ascertained, a bridging image 73-75 is recorded in step 203, which has an overlap region with the first target image or with the previous bridging image. A current pose 93-95 is ascertained on the basis of this overlap region and the previously ascertained pose of the distance measuring device.

Upon triggering of the second distance measurement by the user, in step 202, a distance 14 to the second target point is measured and a second target image 72 is recorded, which also has an overlap region with the previously recorded image. The measured distance 14 is stored, and a second target pose 92 is ascertained on the basis of the overlap region and optionally a further image 72' of the region around the second target point and also optionally distances measured simultaneously with the image recordings.

A spatial relationship 98 between the first target pose and the second target pose 92 is then derived from the ascertained poses 91-95. The distance 15 between the first target point and the second target point can be ascertained from the spatial relationship 98, the first distance 13, and the second distance 14.

In a special embodiment, a spatial model can additionally be prepared on the basis of the images of the environment. This is achieved, for example, by a SLAM algorithm, i.e., an algorithm for simultaneously localizing the camera and mapping the environment on the basis of the camera images.

Based on the ascertained poses, subsequently, a spatial model is additionally calculated by means of intersection on the basis of the images of the series, for example, a point cloud which contains 3-D coordinates of points of the environment and is populated with the recorded images. The 3-D point cloud is preferably scaled with the aid of distances measured by the laser distance meter—a distance is preferably measured simultaneously with each image recording.

A point cloud of the environment can be generated based on images of the environment, which were recorded using different poses, i.e., positions and alignments, of a camera. The point cloud can, for example, be generated by a structure from motion algorithm (SfM) or also by means of a simultaneous localization and mapping algorithm (SLAM). This means that for those images which are used for a later calculation of the point cloud, the respective pose of the camera is ascertained with the aid of differentiable, in particular striking, points in the environment, which are each imaged in at least two of the images (overlap regions). The differentiable points in the environment are then identified in each of the at least two images, and the poses are calculated by means of resection on the basis of the points identified in the images and on the basis of the distance measurements.

As soon as the poses have been ascertained, i.e., the positions and orientations of the camera at the point in time at which the respective images were recorded, a spatial model is calculated by means of photogrammetric methods based thereon and on the overlapping image regions.

The spatial model can then be used, for example, for ascertaining the spatial relationship between the first target pose and the second target pose, and, in particular for accelerating later measurements in the same environment, can be stored on the device.

An already existing spatial model can be supplemented or consolidated by recording further images during each measurement.

Individual steps of an exemplary embodiment of a method for ascertaining a distance 15 between two target points 10, 11 are illustrated in FIGS. 14a to 14f.

Figure 14A:
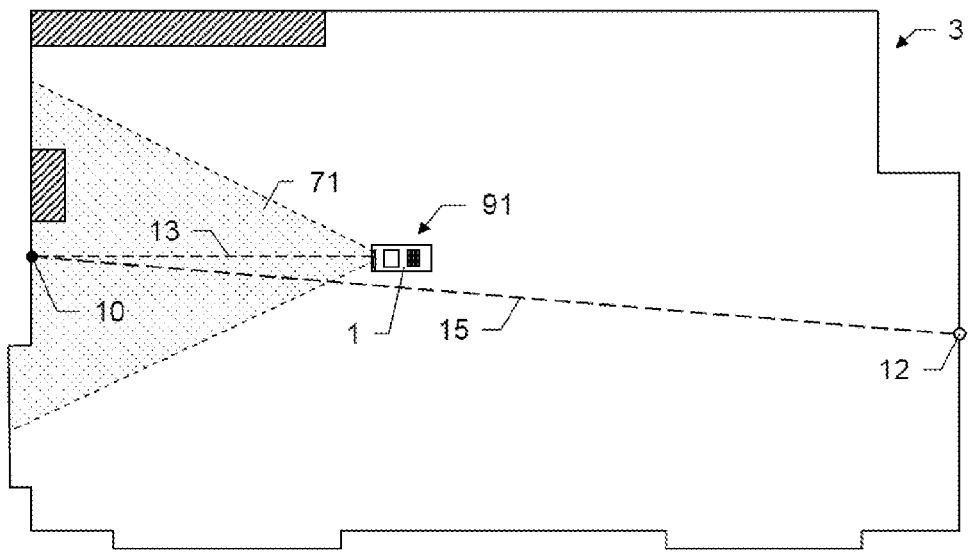
FIGS. 14a-f show steps of an example embodiment of a method for indirectly measuring a distance.
Figure 14B:
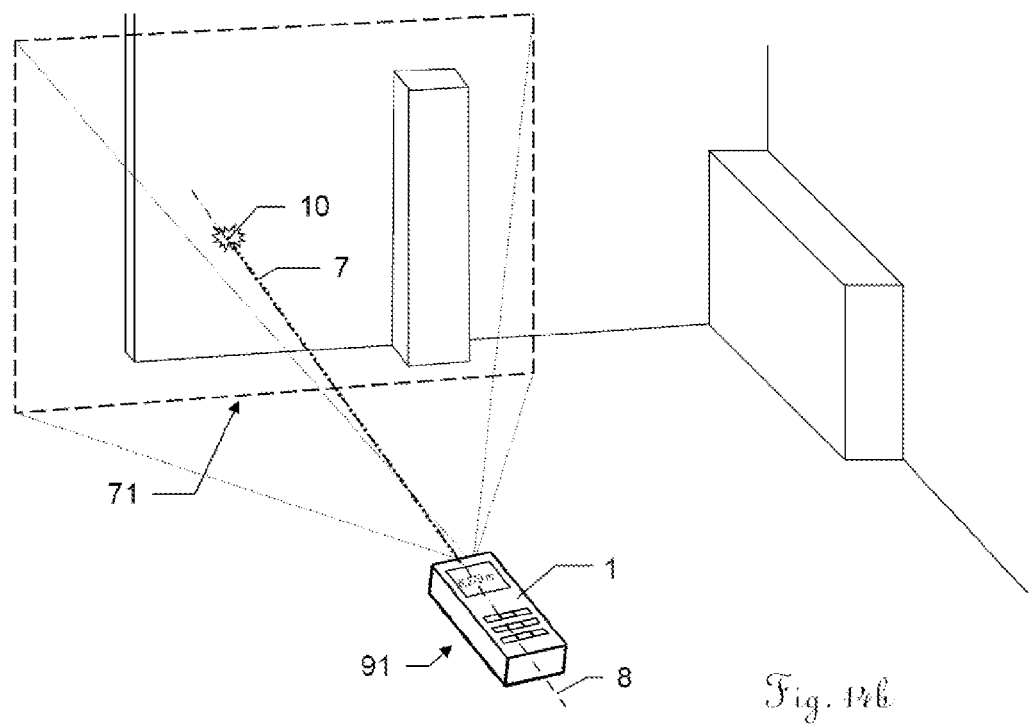

FIG. 14a shows the distance measuring device 1 in a measurement environment in a top view. The two target points 10, 12 and the distance 15 to be ascertained are shown. The distance measuring device measures the distance 13 to the first target point 10 and records a first target image 71 simultaneously thereto. This is shown in a spatial illustration in FIG. 14b: the target point 10 is targeted and measured by means of a laser beam 7 emitted in a first emission direction 8. A relative position and alignment (first target pose 91) can be ascertained by means of the recorded target image 71 and the measured distance 13.

To improve the pose ascertainment, before or after the measurement, an additional image of the measurement region can preferably be recorded from another position and/or with another alignment, or also an existing spatial model, which is already stored in the device in particular, can be used.

Figure 14C:
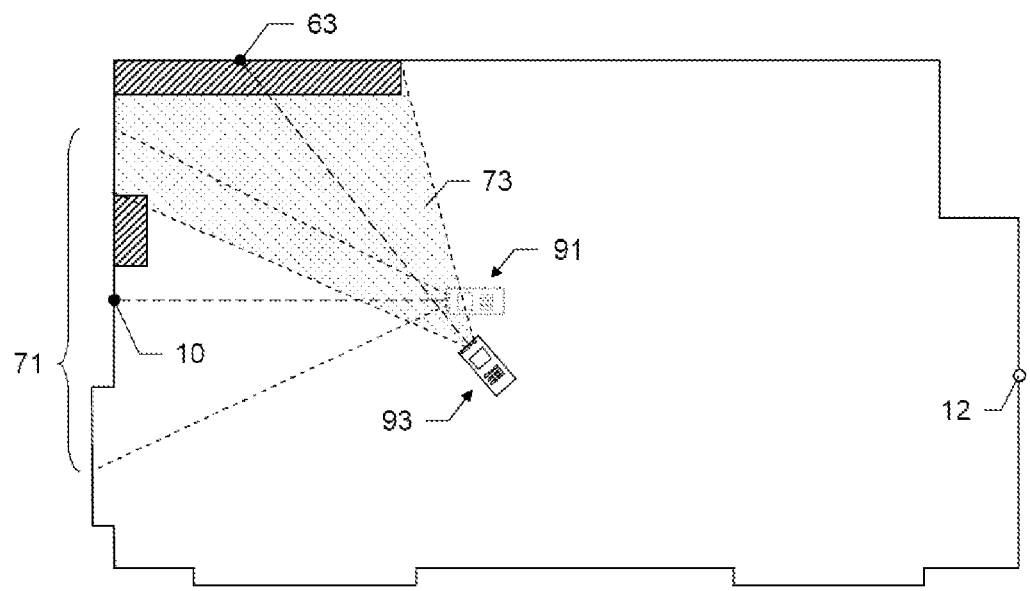
Figure 14D:
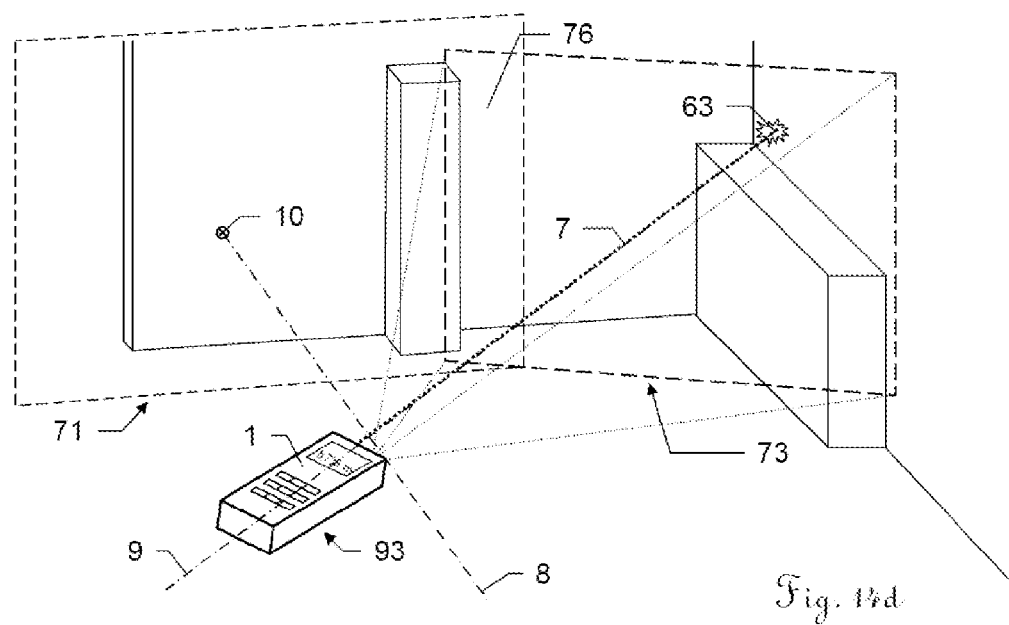

FIGS. 14c and 14d show the recording of a first bridging image 73 in a top view and a spatial illustration.

While the user (not shown here) slowly aligns the distance measuring device 1 in the direction of the second target point 11, the distance measuring device 1 automatically records bridging images, a first bridging image 73 here, which has an overlap region 76 with the first target image 71. Features are then identified in the shared overlap region 76, on the basis of which the pose 93 associated with the first bridging image 73 is ascertained by means of resection.

Simultaneously with the recording of the first bridging image 73, in this embodiment of the method, a scaling distance to a point 63 of the environment imaged in the bridging image 73 is measured automatically by the distance measuring device 1 by way of a laser beam 7 emitted in a second emission direction 9. This scaling distance can be used for scaling the current pose 93 of the distance measuring device 1.

Figure 14E:
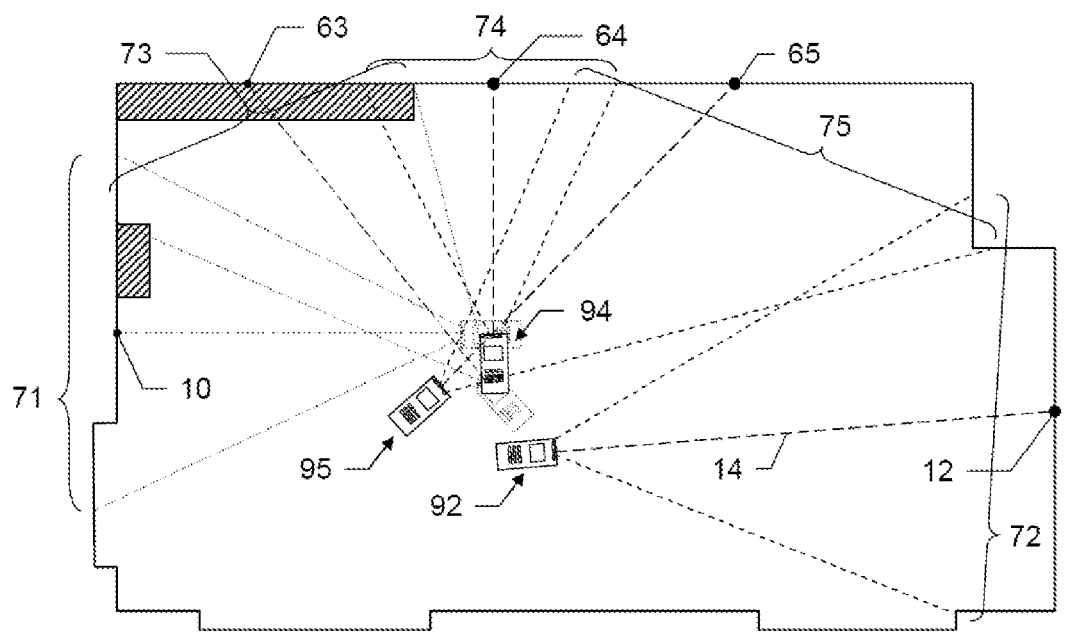

FIG. 14e shows the recording of further bridging images 74, 75 and the second target image 72 in a top view. While the user furthermore continuously aligns the distance measuring device 1 on the second target point 12, this device automatically recognizes whether further bridging images must be recorded to ascertain further poses. This can be performed, for example, via a progressive image recording by the cameras and/or an acceleration sensor of the distance measuring device 1. If the user moves the distance measuring device 1 excessively rapidly or in a manner in which bridging images suitable for ascertaining poses cannot be recorded, the device can output a warning tone, for example. Alternatively, the recording of bridging images can also be triggered by the user, instead of automatically by the device.

The further bridging images 74, 75 are each recorded so that an overlap region with the respective previous image results, in which features can be identified, so that the respective pose 94, 95 of the distance measuring device 1 can be ascertained. Scaling distances, which are measured to points 64, 65 of the environment imaged in the respective bridging image 74, 75, are measured simultaneously with the recording of the image. The scaling distances can be used for scaling the respective current pose 94, 95.

With triggering of the measurement to the second target point 12 by the user, the distance measuring device simultaneously records a second target image 72, wherein again an overlap region with the last recorded bridging image 75 results, in which features can be identified, so that the second target pose 92 can be ascertained.

Figure 14F:
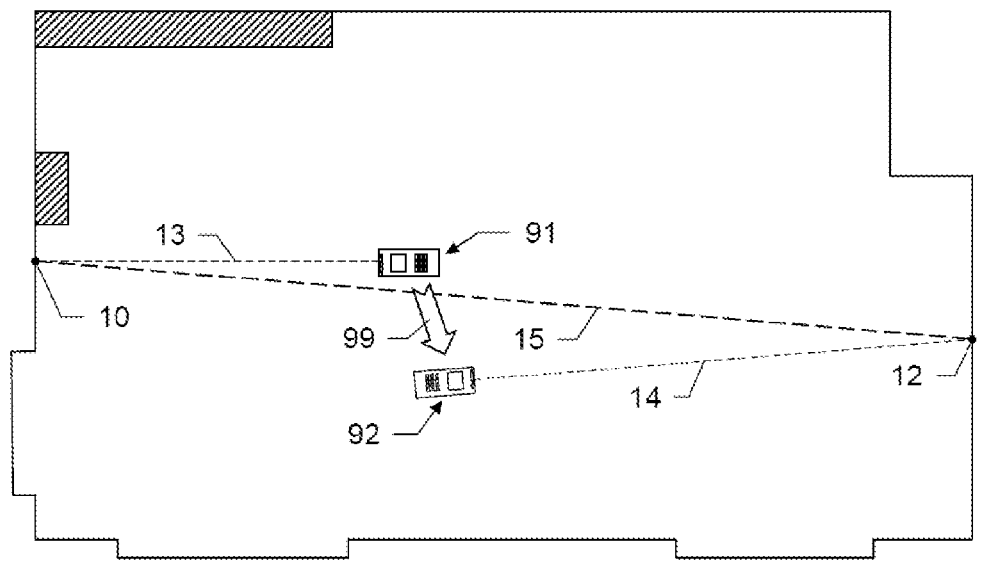

FIG. 14f illustrates the ascertainment of the distance 15 with knowledge of the two target poses 91, 92.

The target poses 91, 92 each comprise at least one relative position and orientation, for example, in relation to a reference point field of the environment or in relation to one another. A spatial relationship is derivable therefrom, which contains an offset 99 and an angle between the emission direction during the measurement of the first distance 13 and the emission direction during the measurement of the second distance 14. The offset 99 comprises the distance between the position of the distance device, in particular the laser distance meter, during the first and the second measurements, and the direction of this distance in space. The distance 15 desired can thus be ascertained from the combination of the spatial relationship, the first distance 13, and the second distance 14.

It is to be noted that—although it is thus provided in the above-described exemplary embodiment—the images do not necessarily have to be recorded in the direction of the respective current emission direction. The camera can also be aligned downward or to the side, for example, to be able to ascertain the respective current pose of the distance measuring device. However, scaling by means of the laser distance meter would then not be possible. The images 51-55 also do not have to be individual images, but rather the image acquisition unit can be embodied as shown in FIG. 3b, 3c, 4a-c, or 5a-c and can have multiple cameras, wherein the images 51-55 are each assembled from multiple linked individual images. In particular if the image acquisition unit is embodied as shown in FIGS. 5a-c, bridging images can be omitted.

The illustrated method can also be used, in addition to the distance measurement, for the purpose of creating a spatial model of the measurement environment or of parts of the measurement environment, as was explained above with reference to FIGS. 7a to 12.

It is obvious that these illustrated figures only schematically illustrate possible exemplary embodiments. The various approaches can also be combined with one another and with methods and devices of the prior art.

What is claimed is:

1. A handheld distance measuring device comprising:
   a laser distance meter for measuring distances to target points in an environment;
   an analysis component for deriving and providing the measured distances; and
   an image acquisition unit having at least one camera for acquiring images of the environment;
   wherein a control unit having program code for controlling a spatial modeling functionality of the distance measuring device, which is implemented for use with a measurement sequence, in the scope of which a first image and a second image of a region of the environment are acquired from different positions of the distance measuring device, these images having a shared image region,
   wherein the image acquisition unit assumes different poses, which represent a respective position and alignment of the distance measuring device, during the acquisition of the first image and the second image,
   wherein in the scope of the spatial modeling functionality and in reaction to a first user command, from a first position of the distance measuring device the first image of a first region of the environment is acquired by the image acquisition unit and a first distance to a first target point in the first region is measured by the laser distance meter in chronological correlation and simultaneously, with the acquisition of the first image,
   wherein in reaction to a second user command, from a second position of the distance measuring device the second image of the first region of the environment is acquired by the image acquisition unit and a second distance to the first target point or to a second target point in the immediate environment of the first target point is measured by the laser distance meter in chronological correlation and simultaneously, with the acquisition of the second image,
   wherein the control unit is embodied for the purpose, in the scope of the spatial modeling functionality, of identifying features of the environment in the images, which are imaged in the shared image region, based on the identified features, the first distance, and the second distance, ascertaining a spatial relationship between the poses, and based on the first image, the second image and the spatial relationship, preparing a spatial model of the environment using stereo photogrammetry, wherein distances between spatial points in the environment can be ascertained on the basis of the spatial model,
   wherein, in the scope of the spatial modeling functionality, the control unit is embodied for the purpose of joining together a first partial spatial model and a second partial spatial model, which have a shared overlap, to form an overall spatial model, wherein distances between spatial points of both regions of the environment can be ascertained on the basis of the spatial model.

2. The handheld distance measuring device according to claim 1, wherein:
   the image acquisition unit has a plurality of cameras; and
   the first image and the second image are each wide-angle images assembled from individual images of the plurality of cameras, wherein the angle range acquired by the images comprises at least 120°,
   wherein the cameras are at least one of:
   arranged in the form of a hemisphere,
   equipped with monochromatic image sensors,
   embodied as wafer-level cameras, and
   embodied with backside illumination.

3. The handheld distance measuring device according to claim 1, further comprising:
   a display device for displaying the spatial model and spatial points, and
   an input device for selecting spatial points in the spatial model by way of a user,
   wherein the control unit is embodied for the purpose of ascertaining a distance between the selected spatial points and the display device is embodied for the purpose of displaying this distance,
   wherein the display device and the input device are embodied as a touchscreen.

4. The handheld distance measuring device according to claim 1, wherein:
   the spatial model has a plurality of spatial coordinates obtained using feature extraction and also image data of the images recorded by the image acquisition unit.

5. The handheld distance measuring device according to claim 1, wherein:
   the at least one camera of the image acquisition unit is embodied for recording high-contrast images, and
   the control unit is embodied for the purpose of identifying features in the high-contrast images in the scope of the spatial modeling functionality.

6. The handheld distance measuring device according to claim 1, further comprising means for wireless data transmission,
   wherein the spatial model is transmittable using the wireless data transmission from the distance measuring device to at least one external device, and/or using the wireless data transmission, data are transmittable from the distance measuring device to at least one external device, wherein the data include at least coordinates of spatial points and/or image and distance data, and the spatial model can be prepared by a computing unit of the external device based on the data.

7. The handheld distance measuring device according to claim 1, further comprising:
   a plurality of laser distance meters for measuring distances to a plurality of points in the first region, wherein the control unit is embodied for the purpose of using the distances to the plurality of points for ascertaining the spatial relationship.

8. The handheld distance measuring device according to claim 1, further comprising:
an acceleration and/or location sensor including a gyroscope, an inclination sensor, or a compass, for providing acceleration or location data of the distance measuring device, wherein the control unit is embodied for the purpose of using the acceleration or location data for ascertaining the spatial relationship.

9. A method for creating a spatial model of an environment with a handheld distance measuring device, which has a laser distance meter and an image acquisition unit, the method comprising:
acquiring a first image of a first region of the environment by the image acquisition unit from a first position of the distance measuring device, in chronological correlation with the acquisition of the first image, a measurement of a first distance to a first target point in the first region of the environment by the laser distance meter;
acquiring a second image of the first region of the environment by the image acquisition unit from a second position, which deviates from the first position of the distance measuring device, and in chronological correlation with the acquisition of the second image, a measurement of a second distance to the first target point or to another target point in the immediate environment of the first target point, wherein the first image and the second image have a shared image region, wherein the image acquisition unit assumes different poses, which represent the respective position and alignment of the distance measuring device, during the acquisition of the first image and the second image,
identifying features of the environment in the images, which are imaged in the shared image region,
ascertaining, based on the identified features, the first distance, and the second distance, a spatial relationship between the poses; and
preparing a spatial model based on the first image, the second image, and the spatial relationship, using stereo photogrammetry, wherein distances between spatial points of the environment can be ascertained on the basis of the spatial model,
wherein the prepared spatial model is a first partial spatial model, the method further comprising:
acquiring a third image of a second region of the environment by the image acquisition unit from a third position of the distance measuring device, in chronological correlation, with the acquisition of the third image, a measurement of a third distance to a second target point in the second region of the environment by the laser distance meter,
acquiring a fourth image of the second region of the environment by the image acquisition unit from a fourth position, which deviates from the third position of the distance measuring device, and in chronological correlation with the acquisition of the fourth image, a measurement of a fourth distance to the second target point or to another target point in the immediate environment of the second target point, wherein the third image and the fourth image have a shared image region, and the image acquisition unit assumes different poses, which represent the respective position and alignment of the distance measuring device, during the acquisition of the third image and the fourth image,
identifying features in the environment, which are imaged in the shared image region,
ascertaining a spatial relationship between the poses based on the identified features, the third distance, and the fourth distance,
preparing a second partial spatial model of the environment based on the third image, the fourth image, and the spatial relationship; and
assembling an overall spatial model from the first partial spatial model and the second partial spatial model, which have a shared overlap, wherein distances between spatial points of both regions of the environment can be ascertained on the basis of the spatial model.

10. The method according to claim 9, wherein the spatial model has a plurality of spatial coordinates obtained using feature extraction, and image data of the images recorded by the image acquisition unit.

11. A method for creating a spatial model of an environment with a handheld distance measuring device, which has a laser distance meter and an image acquisition unit, the method comprising:
acquiring a first image of a first region of the environment by the image acquisition unit from a first position of the distance measuring device, in chronological correlation with the acquisition of the first image, a measurement of a first distance to a first target point in the first region of the environment by the laser distance meter;
acquiring a second image of the first region of the environment by the image acquisition unit from a second position, which deviates from the first position of the distance measuring device, and in chronological correlation with the acquisition of the second image, a measurement of a second distance to the first target point or to another target point in the immediate environment of the first target point, wherein the first image and the second image have a shared image region, wherein the image acquisition unit assumes different poses, which represent the respective position and alignment of the distance measuring device, during the acquisition of the first image and the second image,
identifying features of the environment in the images, which are imaged in the shared image region,
ascertaining, based on the identified features, the first distance, and the second distance, a spatial relationship between the poses
preparing a spatial model based on the first image, the second image, and the spatial relationship, using stereo photogrammetry, wherein distances between spatial points of the environment can be ascertained on the basis of the spatial model; and
acquiring at least one additional image to identify additional spatial points in the environment, wherein the additional image has a shared image region in each case with the first or second image,
wherein the spatial model is also prepared based on the additional image, or is supplemented based on the additional image.

12. The method according to claim 9, wherein:
the spatial model is displayed on a display device of the distance measuring device, and
a distance between two spatial points, which are selected by a user using an input device, is ascertained by a control unit of the distance measuring device and displayed on the display device, wherein the distance measuring device has a touchscreen, which comprises the display device and the input device.

13. The method according to claim 9, wherein:
the distance measuring device has means for wireless data transmission, wherein
the spatial model is transmitted using the wireless data transmission from the distance measuring device to at least one external device, or
the spatial model is prepared based on data transmitted using the wireless data transmission from the distance measuring device to an external device,
wherein the spatial model is displayed on the external device and a distance between two reference points selected by a user is ascertained by a computing unit of the external device and displayed thereon.

14. The method according to claim 9, wherein to ascertain the spatial relationship distances to a plurality of points in the first region, which are measured by a plurality of laser distance meters of the distance measuring device, are used.

15. The method according to claim 9, wherein to ascertain the spatial relationship acceleration or location data, which are provided by an acceleration and/or location sensor of the distance measuring device, are used, wherein the acceleration and/or location sensor comprises a gyroscope, an inclination sensor, or a compass.

16. One or more non-transitory computer-readable media storing one or more programs that are configured, when executed, to cause one or more processors to execute the method comprising:
identifying features in the-an environment, which are imaged in shared image regions,
ascertaining a spatial relationship between poses based on the identified features, a first distance, and a second distance, and
preparing a first spatial model of the environment, based on a first image, a second image, and the spatial relationship;
ascertaining a spatial relationship between poses based on the identified features, a third distance, and a fourth distance,
preparing a second partial spatial model of the environment based on a third image, a fourth image, and the spatial relationship; and
assembling an overall spatial model from the first partial spatial model and the second partial spatial model, which have a shared overlap, wherein distances between spatial points of both regions of the environment can be ascertained on the basis of the spatial model.

17. A method for ascertaining a distance between a first target point and a second target point using a handheld distance measuring device, which has a laser distance meter and an image acquisition unit having at least one camera, having a measurement sequence comprising:
measuring a first distance to the first target point from a first position of the distance measuring device,
measuring a second distance to the second target point from a second position of the distance measuring device,
acquiring a series of images, which has at least one first target image and one second target image and optionally bridging images, by at least one camera of the distance measuring device,
wherein the first target image is acquired in chronological correlation and simultaneously, with the measurement of the first distance,
wherein the second target image is acquired in chronological correlation and simultaneously, with the measurement of the second distance,
wherein in each case successive images of the series have a shared image region, and
wherein the image acquisition unit assumes different poses, which represent the position and alignment of the distance measuring device, during the acquisition of the images,
identifying features in the environment based on the series of images, features in the environment, which are imaged in at least one shared image region,
ascertaining for each of the acquired images the respective pose of the distance measuring device based on the identified features,
ascertaining a spatial relationship between a first target pose assumed during the measurement of the first distance and a second target pose assumed during the measurement of the second distance, and
ascertaining the distance between the first target point and the second target point with the aid of the spatial relationship,
wherein the at least one bridging image is recorded,
wherein in each case a scaling distance is measured by the laser distance meter in chronological correlation and simultaneously, with the recording of bridging images of the series of images, and
wherein the measured scaling distances are used for ascertaining the respective intermediate poses, for scaling a position of the distance measuring device.

18. One or more non-transitory computer-readable media storing one or more programs that are configured, when executed, to cause one or more processors to execute the method comprising:
identifying features in an environment, which are imaged in shared image regions, ascertaining a spatial relationship between poses based on the identified features, a first distance, and a second distance, and
preparing a first spatial model of the environment, based on a first image, a second image, and the spatial relationship,
acquiring at least one additional image to identify additional spatial points in the environment, wherein the additional image has a shared image region in each case with the first or second image,
wherein the spatial model is also prepared based on at least one additional image, or is supplemented based on the at least one additional image.

* * * * *